(12) United States Patent
Bairong

(10) Patent No.: US 9,328,958 B2
(45) Date of Patent: May 3, 2016

(54) APPARATUS AND SYSTEM FOR MANUFACTURING QUALITY COAL PRODUCTS

(76) Inventor: Li Bairong, Guangdong (CN)

( * ) Notice: Subject to any disclaimer, the term of this patent is extended or adjusted under 35 U.S.C. 154(b) by 367 days.

(21) Appl. No.: 14/118,048

(22) PCT Filed: May 14, 2012

(86) PCT No.: PCT/CN2012/075445
§ 371 (c)(1),
(2), (4) Date: Jul. 2, 2014

(87) PCT Pub. No.: WO2012/163222
PCT Pub. Date: Dec. 6, 2012

(65) Prior Publication Data
US 2014/0352168 A1 Dec. 4, 2014

(30) Foreign Application Priority Data
May 31, 2011 (CN) .......................... 2011 1 0145164

(51) Int. Cl.
*F26B 3/16* (2006.01)
*C10B 47/04* (2006.01)
(Continued)

(52) U.S. Cl.
CPC . *F26B 3/16* (2013.01); *C10B 47/04* (2013.01); *C10B 47/16* (2013.01); *C10B 53/04* (2013.01);
(Continued)

(58) Field of Classification Search
CPC .............. F26B 3/00; F26B 3/16; F26B 17/00; F26B 17/145; F26B 25/00; F26B 25/16; C10L 5/00; C10L 5/28; F01P 11/00; F01P 11/10; F28D 7/00; F28D 7/10; F28D 7/12; Y02P 20/00; Y02P 20/129
USPC .................. 34/570, 218, 224, 168, 172, 167; 44/626, 629; 165/51, 164, 157; 60/579
See application file for complete search history.

(56) References Cited

U.S. PATENT DOCUMENTS 2,592,712 A * 4/1952 Knoy ...................... F25B 27/02
62/101

(Continued)

FOREIGN PATENT DOCUMENTS

CN 2354089 12/1999
CN 101519614 9/2009
(Continued)

OTHER PUBLICATIONS

Written Opinion and International Search Report for PCT/CN2012/075445 dated Aug. 30, 2012. (English Translation).
(Continued)

*Primary Examiner* — Stephen M Gravini
(74) *Attorney, Agent, or Firm* — Calfee, Halter & Griswold, LLP

(57) ABSTRACT

The present application discloses an apparatus for manufacturing high-quality coal products. In certain embodiments, the apparatus comprises a housing and a heat conducting mechanism disposed within the housing. The heat conducting mechanism is provided with a heat conducting medium inlet proximate a material outlet end and a thermal conduction medium outlet proximate a material inlet end. The heat conducting mechanism comprises multiple groups of heat conducting units and the heating conducting unit comprises a plurality of heat conducting tubes. The heat conducting tubes are in communication with the heat conducting medium inlet and outlet. A plurality of fins inclining downward relative to the vertical direction are arranged along the longitudinal direction between adjacent heat conducting tubes. The present application also discloses a system for manufacturing high-quality coal products, comprising a material feed apparatus, a high-quality coal product production apparatus, a heat-conducting medium supply apparatus, and a recycling processing apparatus.

105 Claims, 17 Drawing Sheets

(51) Int. Cl.
*C10B 47/16* (2006.01)
*C10B 53/04* (2006.01)
*F26B 17/16* (2006.01)
*C10L 5/28* (2006.01)
*F26B 17/14* (2006.01)
*F26B 25/00* (2006.01)
*F26B 25/16* (2006.01)
*C10L 9/08* (2006.01)

(52) U.S. Cl.
CPC ... *C10L 5/28* (2013.01); *C10L 9/08* (2013.01); *F26B 17/145* (2013.01); *F26B 17/16* (2013.01); *F26B 25/002* (2013.01); *F26B 25/16* (2013.01); *Y02P 20/129* (2015.11)

(56) References Cited

U.S. PATENT DOCUMENTS

| | | | | |
|---|---|---|---|---|
| 3,373,503 | A * | 3/1968 | Kline | F26B 19/005 34/170 |
| 3,384,165 | A * | 5/1968 | Mathews | F28B 1/06 165/122 |
| 3,899,359 | A * | 8/1975 | Stachurski | F25B 21/02 136/205 |
| 4,344,411 | A * | 8/1982 | Dearborn | F24B 1/183 126/34 |
| 4,408,548 | A * | 10/1983 | Schmalfeld | F23C 7/06 110/263 |
| 6,714,413 | B1 * | 3/2004 | Ghosh | F28D 15/0266 165/104.21 |
| 2008/0201980 | A1 * | 8/2008 | Bullinger | B03B 4/06 34/493 |
| 2010/0071871 | A1 * | 3/2010 | Gaensler | F28F 9/0219 165/51 |
| 2014/0352168 | A1 * | 12/2014 | Bairong | C10B 47/04 34/570 |

FOREIGN PATENT DOCUMENTS

| | | | | |
|---|---|---|---|---|
| CN | 101706196 | | 5/2010 | |
| CN | 102260559 | | 11/2011 | |
| CN | WO 2012163222 | A1 * | 12/2012 | ............ C10B 47/04 |
| EP | 0819902 | | 1/1998 | |

OTHER PUBLICATIONS

Zeng Zaichun, A Brief Study on Lignite Drying and Upgrading Technology, Chemical Engineering Design, No. 1 pp. 3-5, Jan. 2011.
International Preliminary Report on Patentability for PCT/CN2012/075445 dated Dec. 2, 2013. (English Translation).

* cited by examiner

APPARATUS AND SYSTEM FOR MANUFACTURING QUALITY COAL PRODUCTS

CROSS REFERENCE TO RELATED APPLICATIONS

This application is the U.S. national phase entry of PCT Application Number PCT/CN2012/075445, having an international filing date of May 14, 2012, which in turn claims priority to Chinese Patent Application No. 201110145164.X, titled "APPARATUS AND SYSTEM FOR MANUFACTURING HIGH-QUALITY COAL PRODUCTS", filed with the State Intellectual Property Office of China on May 31, 2011, the entire contents of both applications are hereby incorporated by reference in their entirety.

FIELD OF THE INVENTION

The present application relates to a technical field of upgrading a quality of the coal, and particularly to an apparatus and a system for manufacturing high-quality coal products.

BACKGROUND OF THE INVENTION

Currently, coal is a major resource, and the exploitation and utilization of the coal has been attracting broad attention. In China, in accordance with a degree of coalification, the coal is divided into the following kinds from low to high: brown coal, low rank bituminous coal, medium rank bituminous coal, meager coal, and anthracite, where the brown coal has a lowest degree of coalification and takes around 40% of world coal reserves and 13% of Chinese coal available reserves, hence the reserves of the brown coal is huge.

At present, coal with high coalification degree has been considerably exploited and utilized. While coal with low coalification degree, such as the brown coal, is difficult to be exploited and utilized on a large scale and is left unused in large quantity due to a high moisture (about 20% to 60%), a low calorific value, susceptibility to weathering and spontaneous combustion, a high transportation cost per unit energy (which results in difficulties in long-distance transportation and storage), a relatively low heat efficiency and a large greenhouse gas emission from direct firing.

There are two types of upgrading treatment systems for brown coal in the prior art. One system uses hot gas to blast the brown coal directly and dry the brown coal. The hot gas is made up of air and water vapor. This system has a low drying temperature, a low heat efficiency, and a low drying degree, thus is apt to catch a fire. This system may also reduce volatile matters with a high calorific value in the brown coal. This system, since using hot gas to dry brown coal directly, processes brown coal in small batches. Processing of large batches poses a problem of exposing the brown coal located inside the batch to an improper processing temperature. Therefore, this system has a small treatment capacity and cannot perform the upgrading treatment for the brown coal on a large scale. The other system uses a coke oven to treat the brown coal. This system is intermittent, however, may produce a significant amount of environmental pollutants. Also, this system is unable to discharge the substances generated in the treatment process such as gas and dust in a timely manner, which affects the upgrading temperature. Therefore, it can not ensure that the proper temperature is evenly distributed throughout the oven, which affects the upgrading effectiveness of this system. In other words, since the gas generated in the treatment process cannot be discharged in a timely manner, these treatment facilities in the prior art cannot control the treatment temperature to acquire desirable coal products.

SUMMARY OF THE INVENTION

The problem to be solved by the present application is to provide an apparatus for manufacturing high-quality coal products, which may ensure that all the coal in the apparatus may be heated at a predetermined temperature, and the temperature in the manufacturing process is controllable.

To this end, it is also provided according to the present application a system for manufacturing high-quality coal products so as to treat the coal environmental-friendly, which may recycle the energy generated in the treatment process, reduce the cost, and reduce the waste emissions.

For solving the above technical problems, the present application provides the following technical solutions.

An apparatus for manufacturing high-quality coal products includes a housing, a material feeding end and a material discharging end respectively arranged at two ends of the housing, where at least two series of exhaust passages are arranged outwards from a center of the housing, and each of the exhaust passages communicates with an exhaust end in the housing;

a heat conducting mechanism is arranged in a chamber of the housing between the material feeding end and the material discharging end;

the heat conducting mechanism is provided with a heat conducting medium inlet near the material discharging end and a heat conducting medium outlet near the material feeding end;

the heat conducting mechanism includes a plurality of heat conducting units that are spaced, each of which includes a plurality of heat conducting tubes communicating with the heat conducting medium inlet and the heat conducting medium outlet; and a plurality of fins inclining downwardly with respect to a vertical direction are arranged in a longitudinal direction between adjacent heat conducting tubes, and each of the fins arranged between the heat conducting tubes near the exhaust passages has a lower end inclining in a direction away from the exhaust passages so as to block an exhaust port arranged on a wall face of the each of the exhaust passages.

Preferably, the fins include: primary fins and secondary fins, where the whole body of each of the primary fins is connected to a pair of adjacent heat conducting tubes and where each of the secondary fins includes an upper end connected to a pair of adjacent heat conducting tubes and a lower end extending out of a space between the pair of adjacent heat conducting tubes.

Preferably, the primary fins located between the heat conducting tubes away from the exhaust passages are arranged to include two groups in the longitudinal direction, where one group is located at one side in a space between the heat conducting tubes, and each of the primary fins in this group includes a lower end inclining in a direction close to a centerline of the housing, where the other group is located at the other side in the space between the heat conducting tubes, and each of the primary fins in this group includes a lower end inclining in a direction away from the centerline of the housing, and where the two groups of primary fins are arranged alternately in the longitudinal direction.

Preferably, the secondary fins located between the heat conducting tubes away from the exhaust passages are arranged to include two groups in the longitudinal direction, where one group is located at one side in a space between the heat conducting tubes, and each of the secondary fins in this group includes a lower end inclining in a direction close to a centerline of the housing, where the other group is located at the other side in the space between the heat conducting tubes, and each of the secondary fins in this group includes a lower end inclining in a direction away from the centerline of the housing, and where the two groups of secondary fins are arranged alternately in the longitudinal direction.

Preferably, the fins incline downwardly with respect to the vertical direction by an angle ranging from 0 degree to 45 degree.

Preferably, the fins incline downwardly with respect to the vertical direction by an angle ranging from 8 degree to 45 degree.

Preferably, where an interval between adjacent primary fins in the vertical direction ranges from 70 mm to 3500 mm, and an interval between adjacent secondary fins in the vertical direction ranges from 70 mm to 3500 mm.

Preferably, the primary fins are distributed at uniform intervals in the vertical direction.

Preferably, the exhaust passages include center exhaust passages arranged in the housing and looped exhaust passages arranged at a periphery of the plurality of heat conducting tubes.

Preferably, one of the center exhaust passages is arranged in the center of the housing.

Preferably, one of the looped exhaust passages is arranged at a periphery of the outmost heat conducting tubes.

Preferably, a plurality of the center exhaust passages are symmetrically arranged with respect to the centerline of the housing.

Preferably, a plurality of the looped exhaust passages are symmetrically arranged with respect to the centerline of the housing.

Preferably, a distance between two adjacent series of exhaust passages is below 1000 mm.

Preferably, an upper exhaust port is arranged on the housing near the material feeding end.

Preferably, each of the heat conducting units further includes a heat conducting medium introducing portion and a heat conducting medium discharging portion, and the plurality of heat conducting tubes are arranged between the heat conducting medium introducing portion and the heat conducting medium discharging portion, where the heat conducting medium introducing portion of each of the heat conducting units communicates with a heat conducting medium introducing manifold, and the heat conducting medium discharging portion of each of the heat conducting units communicates with a heat conducting medium discharging manifold, and where the heat conducting medium introducing portion is arranged near the material discharging end, and the heat conducting medium discharging portion is arranged near the material feeding end.

Preferably, the exhaust passages include a center exhaust passage arranged in the housing and a looped exhaust passage arranged at a periphery of the plurality of heat conducting tubes, and the center exhaust passage extends to the heat conducting medium introducing portion from a lower end of the heat conducting medium discharging portion.

Preferably, the heat conducting units are distributed vertically and are parallel to each other.

Preferably, a distance between adjacent heat conducting units increases or decreases gradually from top to bottom in the vertical direction.

Preferably, a distance between adjacent heat conducting tubes increases or decreases gradually from top to bottom in the vertical direction.

Preferably, the heat conducting units are distributed at uniform intervals.

Preferably, the interval between adjacent heat conducting units ranges from 70 mm to 500 mm.

Preferably, the heat conducting medium introducing portion and the heat conducting medium discharging portion in each of the heat conducting units are arranged in a horizontal direction, and the heat conducting tubes are arranged in the vertical direction.

Preferably, the heat conducting tubes are distributed at uniform intervals.

Preferably, a cross section of the heat conducting tube is of a square shape, a polygonal shape with equal to or more than five sides, a circular shape, or an elliptic shape.

Preferably, the heat conducting medium discharging portions are of a straight plate shape as a whole, and have a spire-shaped upper end.

Preferably, a fin inclining downwardly in the vertical direction is arranged between adjacent heat conducting medium introducing portions.

Preferably, a plurality of groups of fins are arranged between adjacent heat conducting medium introducing portions in the longitudinal direction, and each group includes a plurality of fins.

Preferably, the heat conducting medium introducing portions are of a straight plate shape as a whole, and have a spire-shaped upper end.

Preferably, a material feeding hopper is arranged at the material feeding end and includes a lower end arranged close to an upper end of the heat conducting units.

Preferably, the material feeding hopper includes an upper material feeding section, a middle material feeding section and a lower material feeding section, and the middle material feeding section has an opening diameter smaller than that of the upper material feeding section and than that of the lower material feeding section.

Preferably, the opening diameter of the upper material feeding section decreases gradually from top to bottom, and the opening diameter of the lower material feeding section increases gradually from top to bottom.

Preferably, a material discharging hopper is arranged at the material discharging end and includes an upper end arranged close to a lower end of the heat conducting units.

Preferably, the material discharging hopper includes an upper material discharging section and a lower material discharging section which are in communication with each other vertically, and the upper material discharging section includes a plurality of sub-hoppers arranged horizontally.

Preferably, a water cooling wall is arranged at an outer side of the lower material discharging section.

Preferably, a material conveyor is arranged at a material discharging port of the material discharging hopper.

Preferably, the material conveyor is provided with a cooling mechanism.

Preferably, the cooling mechanism is a water cooling wall arranged on a housing and a hollow shaft of the material conveyor.

Preferably, the material conveyor includes a housing, a material feeding port and a material discharging port each being arranged on the housing, and a material conveying screw arranged in the housing, and the screw includes a rotation shaft connected to a driving mechanism.

Preferably, the material conveying screw has a diameter smaller than an opening diameter of the material discharging port of the material discharging hopper.

Preferably, the exhaust passages are connected to an exhaust end via an exhaust manifold, and at least an upper end of the exhaust manifold has an opening diameter increasing gradually from top to bottom.

Preferably, a plurality of the exhaust ends are distributed in a longitudinal direction of the housing.

Preferably, the exhaust end located at a lower end is connected to a heating mechanism of a heat conducting medium via a connecting tube.

Preferably, the heat conducting medium is hot gas.

Preferably, the apparatus for manufacturing high-quality coal products further includes a temperature controlling mechanism including:

a sensor, arranged on the heat conducting medium discharging portion of each of the heat conducting units and configured to acquire a temperature signal at the heat conducting medium discharging portion;

a controller, configured to compare the temperature signal with a preset temperature value, and send a temperature controlling instruction according to a comparison result; and a valve, arranged in the heat conducting medium discharging portion of each of the heat conducting units and configured to regulate a valve opening in response to the temperature controlling instruction.

Preferably, a sealing member is arranged on the housing near the material feeding end so as to prevent the material from escaping from the material feeding end.

A system for manufacturing high-quality coal products according to the present application includes:

a material supply apparatus, configured to supply raw coal having a proper treatment granularity for an apparatus for manufacturing high-quality coal products;

at least one apparatus for manufacturing high-quality coal products, comprising a housing, a material feeding end and a material discharging end respectively arranged at two ends of the housing, wherein at least two series of exhaust passages are arranged outwards from a center of the housing, and each of the exhaust passages communicates with an exhaust end in the housing;

a heat conducting mechanism is arranged in a chamber of the housing between the material feeding end and the material discharging end;

the heat conducting mechanism is provided with a heat conducting medium inlet near the material discharging end and a heat conducting medium outlet near the material feeding end;

the heat conducting mechanism includes a plurality of heat conducting units that are spaced, each of which includes a plurality of heat conducting tubes communicating with the heat conducting medium inlet and the heat conducting medium outlet; and a plurality of fins inclining downwardly with respect to a vertical direction are arranged in a longitudinal direction between adjacent heat conducting tubes, and each of the fins arranged between the heat conducting tubes near the exhaust passages has a lower end inclining in a direction away from the exhaust passages so as to block an exhaust port arranged on a wall face of the each of the exhaust passages;

a heat conducting medium supply apparatus, which is connected to the heat conducting medium inlet so as to supply heat conducting medium to the apparatus for manufacturing high-quality coal products; and a recycling apparatus, communicating with the exhaust end so as to recycle matters discharged from the exhaust end, and connected to the heat conducting medium supply apparatus so as to convey the recycled matters to the heat conducting medium supply apparatus.

Preferably, the recycling apparatus includes an exhaust cooling apparatus and a matter separating apparatus, where the exhaust end communicates with the exhaust cooling apparatus, the exhaust cooling apparatus is connected to the heat conducting medium supply apparatus, and the matter separating apparatus communicates with the exhaust cooling apparatus.

Preferably, the exhaust cooling apparatus is a spray tower, a heat exchanger, or a boiler.

Preferably, the matter separating apparatus is an oil-water separation pond or a liquid contaminant treating apparatus.

Preferably, the heat conducting medium outlet includes two ends, one end of which is connected to a power generation mechanism and the other end of which is connected to the heat conducting medium supply apparatus.

Preferably, an opening is arranged on the housing near the material feeding end and is connected to the recycling apparatus via a tube.

Preferably, an opening is arranged on the housing near the material feeding end and is connected to the exhaust cooling apparatus via a tube.

Preferably, the heat conducting medium supply apparatus is a hot-blast furnace, a coal-gas combustion furnace, a coal dust combustion apparatus, a boiler, or a shell and tube heat exchanger.

Preferably, the heat conducting medium supply apparatus includes a coal-gas generator, a coal-gas burner, and an air mixing and discharging apparatus which are arranged in sequence, and wherein an air outlet of the air mixing and discharging apparatus is connected to the heat conducting medium inlet of the heat conducting mechanism.

Preferably, the air mixing and discharging apparatus includes an air inlet, an air mixing chamber, a steady flowing chamber, an air outlet which are connected to the coal-gas burner, and the air mixing chamber is further connected to the heat conducting medium outlet of the heat conducting mechanism.

Preferably, the coal-gas burner is connected to the recycling apparatus.

Preferably, the material supply apparatus includes:

at least one crushing mechanism configured to crush the raw coal; and a sieving mechanism configured to sieve the crushed raw material.

Preferably, the sieving mechanism is a linear sieve.

Preferably, the crushing mechanism includes a double-geared crushing machine and a vibration material feeder, and a material outlet of the vibration material feeder communicates with a material inlet of the double-geared crushing machine.

Preferably, the power generation mechanism includes a waste heat power generation boiler, a stream turbine connected to the waste heat power generation boiler, and a power generator connected to the stream turbine, and wherein the waste heat power generation boiler communicates with the heat conducting medium outlet.

Preferably, the fins include primary fins and secondary fins, where the whole body of each of the primary fins is connected to a pair of adjacent heat conducting tubes, and each of the secondary fins includes an upper end connected to a pair of adjacent heat conducting tubes and a lower end extending out of a space between the pair of adjacent heat conducting tubes.

Preferably, the primary fins located between the heat conducting tubes away from the exhaust passages are arranged to include two groups in the longitudinal direction, where one group is located at one side in a space between the heat conducting tubes, and each of the primary fins in this group includes a lower end inclining in a direction close to a centerline of the housing, where the other group is located at the other side in a space between the heat conducting tubes, and each of the primary fins in this group includes a lower end inclining in a direction away from the centerline of the housing, and where the two groups of primary fins are arranged alternately in the longitudinal direction.

Preferably, the secondary fins located between the heat conducting tubes away from the exhaust passages are arranged to include two groups in the longitudinal direction, where one group is located at one side in a space between the heat conducting tubes, and each of the secondary fins in this group includes a lower end inclining in a direction close to a centerline of the housing, where the other group is located at the other side in a space between the heat conducting tubes, and each of the secondary fins in this group includes a lower end inclining in a direction away from the centerline of the housing, and where the two groups of secondary fins are arranged alternately in the longitudinal direction.

Preferably, the fin inclines downwardly with respect to the vertical direction by an angle ranging from 0 degree to 45 degree.

Preferably, the fin inclines downwards with respect to the vertical direction by an angle ranged from 8 degree to 45 degree.

Preferably, an interval between adjacent primary fins in the vertical direction ranges from 70 mm to 3500 mm.

Preferably, an interval between adjacent secondary fins in the vertical direction ranges from 70 mm to 3500 mm.

Preferably, the primary fins are distributed at uniform intervals in the vertical direction.

Preferably, the exhaust passages include center exhaust passages arranged in the housing and looped exhaust passages arranged at a periphery of the plurality of heat conducting tubes.

Preferably, one of the center exhaust passages is arranged in the center of the housing.

Preferably, one of the looped exhaust passages is arranged at a periphery of the outmost heat conducting tubes.

Preferably, a plurality of center exhaust passages are symmetrically arranged with respect to the centerline of the housing.

Preferably, a distance between two adjacent series of exhaust passages is below 1000 mm.

Preferably, each of the heat conducting units further includes a heat conducting medium introducing portion and a heat conducting medium discharging portion, the plurality of heat conducting tubes are arranged between the heat conducting medium introducing portion and the heat conducting medium discharging portion, where the heat conducting medium introducing portion of each of the heat conducting units communicates with a heat conducting medium introducing manifold, and the heat conducting medium discharging portion of each of the heat conducting units communicates with a heat conducting medium discharging manifold, and where the heat conducting medium introducing portion is arranged near the material discharging end, and the heat conducting medium discharging portion is arranged near the material feeding end.

Preferably, the exhaust passages include a center exhaust passage arranged in the housing and a looped exhaust passage arranged at a periphery of a plurality of heat conducting tubes, and the center exhaust passage extends to the heat conducting medium introducing portion from a lower end of the heat conducting medium discharging portion.

Preferably, the heat conducting units are distributed vertically and are parallel to each other.

Preferably, a distance between adjacent heat conducting units increases or decreases gradually from top to bottom in the vertical direction.

Preferably, a distance between adjacent heat conducting tubes increases or decreases gradually from top to bottom in the vertical direction.

Preferably, the heat conducting units are distributed at uniform intervals.

Preferably, the interval between adjacent heat conducting units ranges from 70 mm to 500 mm.

Preferably, the heat conducting medium introducing portion and the heat conducting medium discharging portion in each of the heat conducting units are arranged in a horizontal direction, and the heat conducting tubes are arranged in the vertical direction.

Preferably, the heat conducting tubes are distributed at uniform intervals.

Preferably, a cross section of the heat conducting tube is of a square shape, a polygonal shape with equal to or more than five sides, a circular shape, or an elliptic shape.

Preferably, the heat conducting medium discharging portions are of a straight plate shape as a whole, and have a spire-shaped upper end.

Preferably, a fin inclining downwardly in the vertical direction is arranged between adjacent heat conducting medium introducing portions.

Preferably, a plurality of groups of fins are arranged between adjacent heat conducting medium introducing portions in the longitudinal direction, and each group includes a plurality of fins.

Preferably, the heat conducting medium introducing portions are of a straight plate shape as a whole, and have a spire-shaped upper end.

Preferably, a material feeding hopper is arranged at the material feeding end and includes a lower end arranged close to an upper end of the heat conducting unit.

Preferably, the material feeding hopper includes an upper material feeding section, a middle material feeding section and a lower material feeding section, and the middle material feeding section has an opening diameter smaller than that of the upper material feeding section and than that of the lower material feeding section.

Preferably, the opening diameter of the upper material feeding section decreases gradually from top to bottom, and the opening diameter of the lower material feeding section increases gradually from top to bottom.

Preferably, a material discharging hopper is arranged at the material discharging end and includes an upper end arranged close to a lower end of the heat conducting unit.

Preferably, the material discharging hopper includes an upper material discharging section and a lower material discharging section which are in communication with each other vertically, and the upper material discharging section includes a plurality of sub-hoppers arranged horizontally.

Preferably, a water cooling wall is arranged at an outer side of the lower material discharging section.

Preferably, a material conveyor is arranged at a material discharging port of the material discharging hopper.

Preferably, the material conveyor is provided with a cooling mechanism.

Preferably, the cooling mechanism is a water cooling wall arranged on a housing and a hollow shaft of the material conveyor.

Preferably, the material conveyor includes a housing, a material feeding port and a material discharging port each being arranged on the housing, and a material conveying screw arranged in the housing, and wherein the screw includes a rotation shaft connected to a driving mechanism.

Preferably, the material conveying screw has a diameter smaller than an opening diameter of the material discharging port of the material discharging hopper.

Preferably, the exhaust passages are connected to an exhaust end via an exhaust manifold, and at least an upper end of the exhaust manifold has an opening diameter increasing gradually from top to bottom.

Preferably, a plurality of exhaust ends are distributed in a longitudinal direction of the housing.

Preferably, the exhaust end located at a lower end is connected to a heating mechanism of a heat conducting medium via a connecting tube.

Preferably, the heat conducting medium is hot gas.

Preferably, the system for manufacturing high-quality coal products further includes a temperature controlling mechanism including:

a sensor, arranged on the heat conducting medium discharging portion of each of the heat conducting units and configured to acquire a temperature signal at the heat conducting medium discharging portion;

a controller, configured to compare the temperature signal with a preset temperature value, and send a temperature controlling instruction according to a comparison result; and a valve, arranged in the heat conducting medium discharging portion of each of the heat conducting units and configured to regulate a valve opening in response to the temperature controlling instruction.

Preferably, a sealing member is arranged on the housing near the material feeding end so as to prevent the material from escaping from the material feeding end.

Compared with the prior art, the apparatus for manufacturing high-quality coal products according to the present application is provided with a heat conducting mechanism, which includes a plurality of heat conducting units. Each of the heat conducting units includes a plurality of heat conducting tubes. Hence, heat conducting medium can be introduced into the heat conducting tube for treating coal. Fins are provided between the heat conducting tubes. The fins may facilitate discharging the gas generated in the treatment process, such that all the coal in the apparatus can be maintained at a predetermined treatment temperature, thereby finally obtaining coal products having a high calorific value. In addition, the fins between the heat conducting tubes for heating the coal facilitates the heat transmission. The fins between the heat conducting tubes inclines with respect to the vertical direction, hence a dynamic material overturning can be implemented, i.e., falling material may be gathered first and then scattered, and further scattered, which may leads to uniform heating of coal and gas discharging. Since gas can be discharged in a timely manner, the temperature of the coal in the apparatus for manufacturing high-quality coal products according to the present application can be controlled flexibly in the treatment process, so as to obtain desirable coal products by adjusting the temperature on requirements. The apparatus for manufacturing high-quality coal products can operate continuously without polluting the environment, and is capable of dehydrating the moisture in the coal, such as brown coal, improving the calorific value, and deriving tar, coal gas or the like. By controlling the heating temperature and heating time, high-quality coal products having a high volatile content and a high calorific value, such as bituminous coal, like-bituminous coal, semi-coking coal, tar oil of middle and low temperature, coal gas, can be manufactured on market requirements. Products, such as coke, tar oil of middle and high temperature, and coal gas, may also be produced.

The system for manufacturing high-quality coal products includes the apparatus for manufacturing high-quality coal products and some recycling apparatuses to recycle the gas and heat generated in the manufacturing process of the apparatus for manufacturing high-quality coal products in a timely manner. A part of the gas and heat may be utilized in the manufacturing process, thus only a certain external source energy is required for the initial startup of the system according to the present application, and the recycled energy may be substantially used in the manufacturing process, thus the cost of the manufacturing process is reduced. Further, a power generation mechanism is communicates with a heat conducting medium outlet, so as to recycle the waste heat for generating electric energy. Therefore, waste emissions are low in the treatment process of coal by using the system for manufacturing high-quality coal products according to the present application. This is advantageous for environment protection and the utilization rate of the energy. The present application has a wide usage. It can be used for non-caking coal having various coalification degrees, that is, from the brown coal having the lowest coalification degree, to bituminous coal and coal ash, as well as other non-caking coals having volatile content (above 10%). Therefore, coal with the worst quality may be even converted to high-quality coal products by the treatment of the present application.

DETAILED DESCRIPTION OF THE INVENTION

For further understanding the present application, preferred solutions of the present application are described hereinafter in conjunction of the embodiments, however it should be understood that these descriptions are only for further illustrating the features and advantages of the present application, and should not be interpreted as limiting the claims of the present application.

Figure 1:
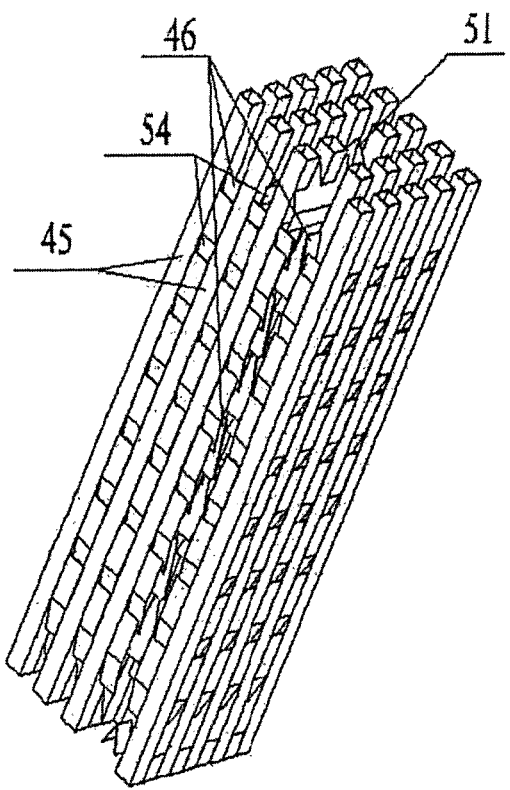
FIG. 1 is a perspective view showing the layout of heat conducting tubes and fins in an apparatus for manufacturing high-quality coal products according to a first embodiment of the present application.
Figure 2:
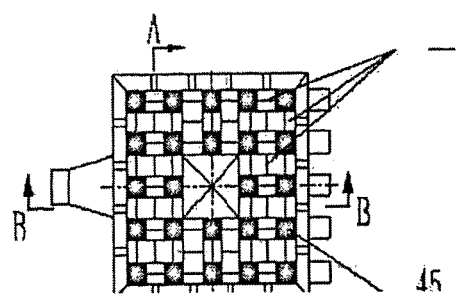
FIG. 2 is a top view of FIG. 1.
Figure 3:
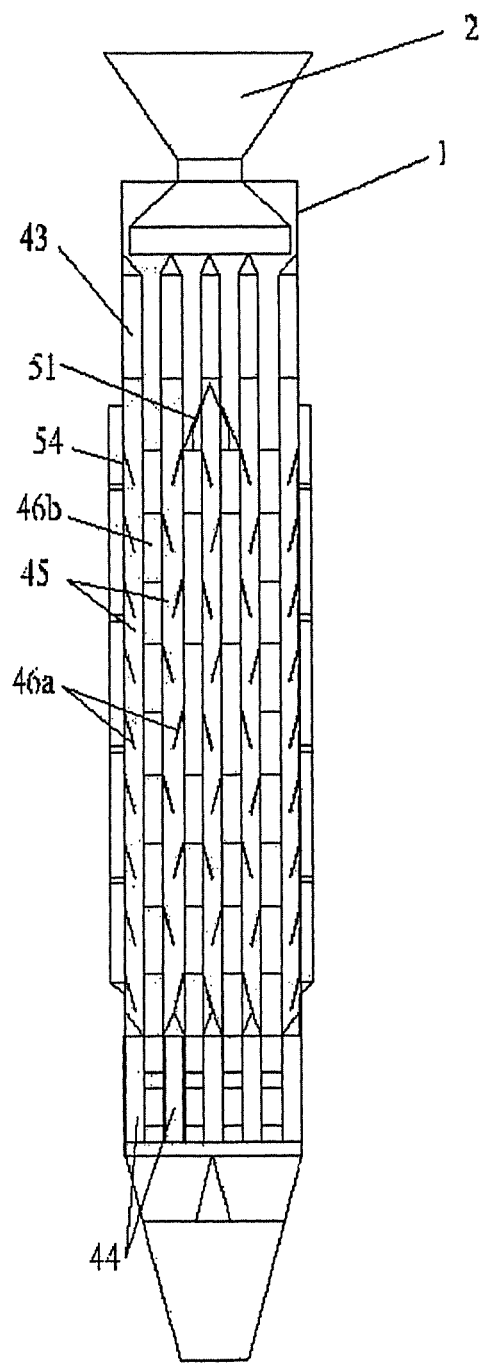
FIG. 3 is a schematic sectional view taken along line A-A in FIG. 2.

The Apparatus for Manufacturing High-Quality Coal Products According to the First Embodiment Reference is made to FIGS. 1 to 11, which illustrate the structure of the apparatus according to the first embodiment of the present application. FIG. 1 is a layout view of heat conducting tubes of the first embodiment. FIG. 2 is a top view of FIG. 1 and also a schematic sectional view taken along line E-E in FIG. 4. The apparatus for manufacturing high-quality coal products in this embodiment includes a housing 1, a material feeding hopper 2 arranged at the top of the housing 1, and a material discharging hopper 3 arranged at the bottom of the housing 1, a heat conducting mechanism 4 arranged in the housing 1, and an exhaust mechanism 5 arranged approximately in a center of the housing 1.

The heat conducting mechanism 4 includes a discharging manifold 41 arranged at the material feeding hopper 2 to discharge a heat conducting medium, a plurality of heat conducting medium discharging portions 43 connected to the discharging manifold 41, an introducing manifold 42 arranged at the material discharging hopper 3 to introduce the heat conducting medium, a plurality of heat conducting medium introducing portions 44 connected to the introducing manifold, and a plurality of heat conducting tubes 45 connected between the introducing portion and the discharging portion. A heat conducting unit is formed by the heat conducting medium introducing portions 44, the heat conducting medium discharging portions 43 arranged corresponding to the heat conducting medium introducing portions 44, and the plurality of heat conducting tubes 45 arranged between the portions 43 and 44 and communicating these two portions. The plurality of heat conducting tubes 45 in each heat conducting unit are arranged at a uniform interval in parallel, and a space is formed between the heat conducting tubes for the movement of material. A plurality of fins 46 are arranged between the heat conducting tubes 45 in a longitudinal direction, and the fins 46 are inclining downwardly by a certain angle with respect to a vertical direction, where the angle may be greater than 0 degree, and less than or equal to 45 degree. Each of the heat conducting tubes 45 has a square cross section in this embodiment. The cross section may be a circular shape, an elliptic shape, or other polygonal shapes in other embodiments.

Figure 4:
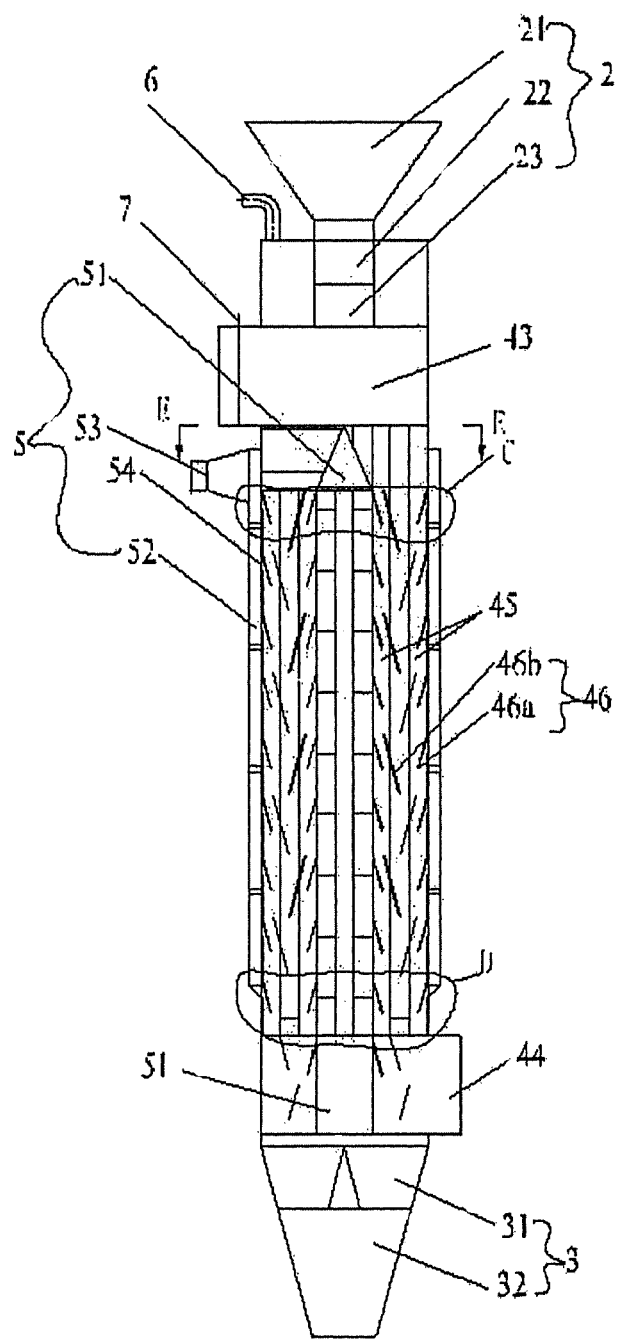
FIG. 4 is a schematic sectional view taken along line B-B in FIG. 2.
Figure 5:
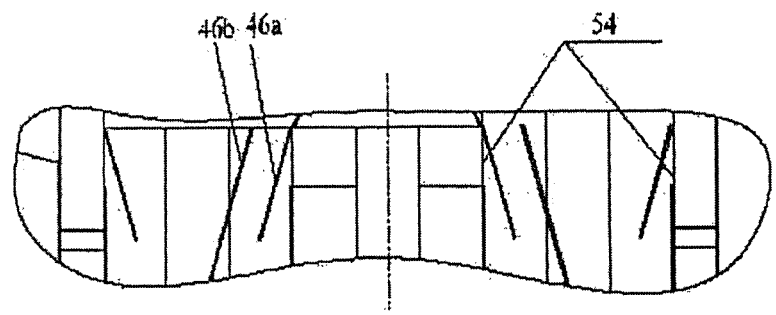
FIG. 5 is an enlarged view of part C in FIG. 4.
Figure 6:
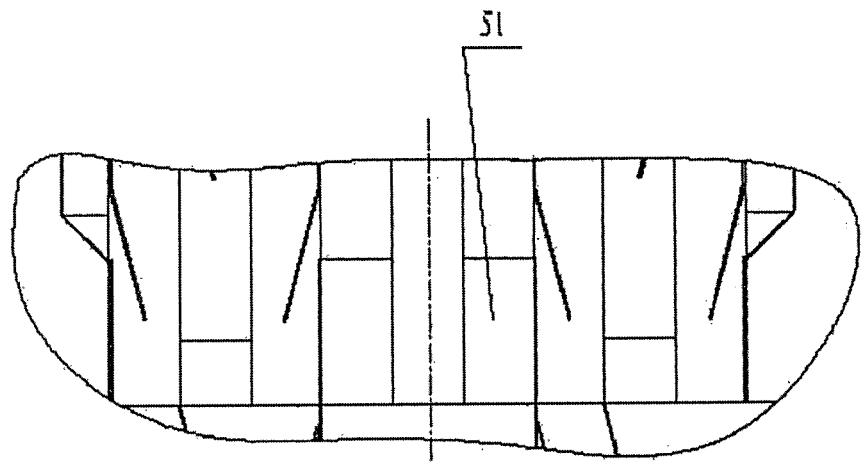
FIG. 6 is an enlarged view of part D in FIG. 4.
Figure 7:
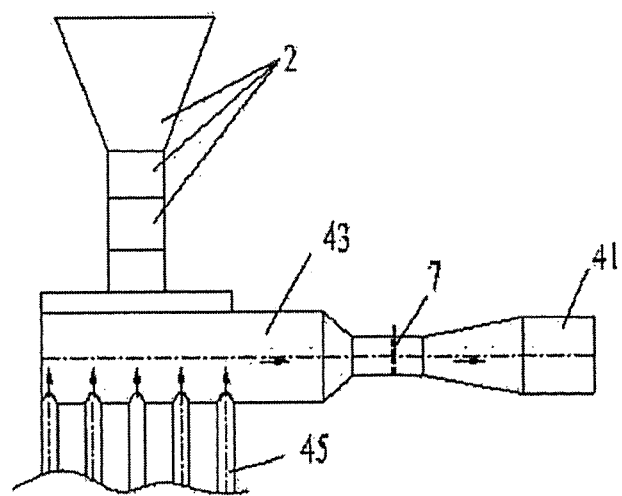
FIG. 7 is a structural view of a material feeding portion and a heat conducting medium outlet portion in FIG. 4 (an arrow indicates a discharging direction of the heat conducting medium in FIG. 7)
Figure 8:
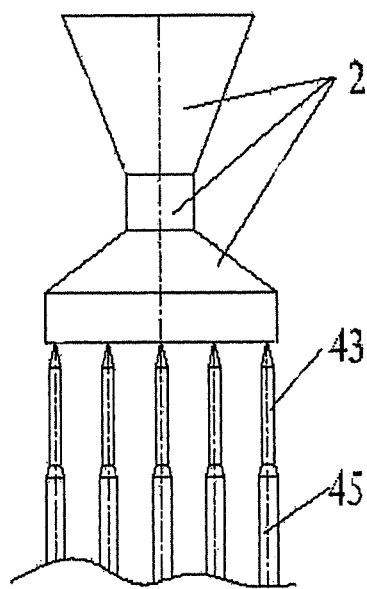
FIG. 8 is a side view of FIG. 7.
Figure 9:
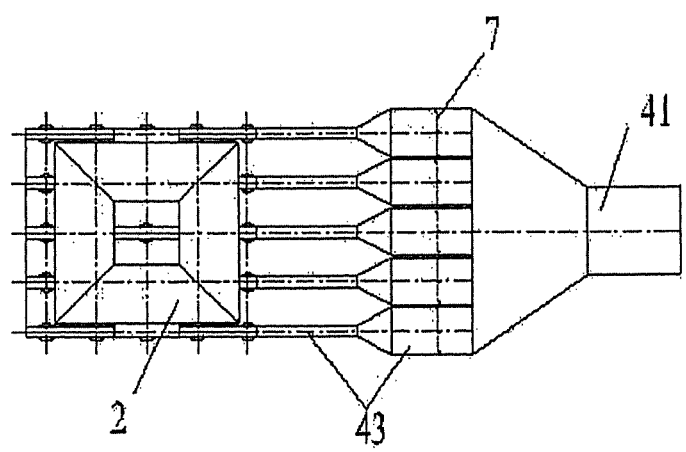
FIG. 9 is a top view of FIG. 7.
Figure 10:
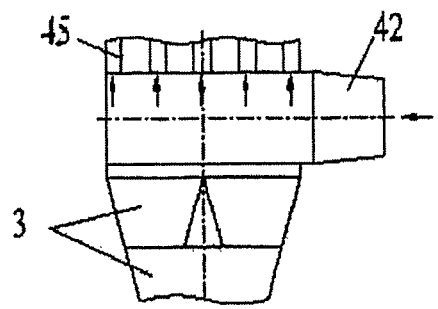
FIG. 10 is a structural view of a material discharging portion and a heat conducting medium inlet portion in FIG. 4 (an arrow indicates a introducing direction of the heat conducting medium in FIG. 10)
Figure 11:
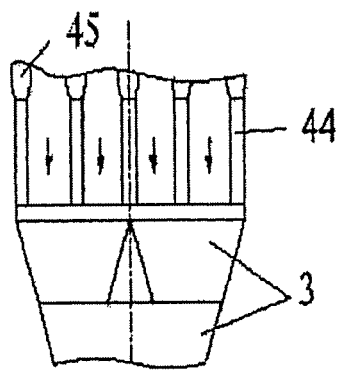
FIG. 11 is a side view of FIG. 10 (an arrow indicates a material discharging direction in FIG. 11)

The fins in this embodiment include primary fins 46a and secondary fins 46b. The primary fins 46a are arranged to be parallel to each other in the longitudinal direction. The whole body of each primary fin 46a is arranged in a space between two adjacent heat conducting tubes and is connected to the two adjacent heat conducting tubes. A lower end of each primary fin 46a is inclined in a direction away from an exhaust passage, so as to block an exhaust port 54 arranged on a wall face of the exhaust passage near the heat conducting tube, such that the gas can be discharged from the exhaust port 54 under the action of an internal negative pressure, while the solid material being blocked by the fins can be remained in the housing. Therefore, the primary fins 46a are mainly used to facilitate gas discharging, and apparently may have a certain material overturning effect. In this embodiment, every four primary fins arranged at the same height form a hopper-shaped material falling space having a bigger upper opening diameter and a smaller lower opening diameter, such that falling material may be gathered first and then scattered, and further scattered at the fins with the next height. Due to the arrangements of fins, dynamic material overturning and even heat transmission can be realized, so that all the material in the housing may be treated at a proper temperature, thereby manufacturing high-quality coal products. As shown in FIG. 4, in this embodiment, each secondary fin 46b has an upper end connected to a pair of adjacent heat conducting tubes and a lower end extending out of a space between the pair of adjacent heat conducting tubes, that is, extending into a material falling space between this pair of heat conducting tubes and an adjacent pair of heat conducting tubes. The material falling space also accommodates a further secondary fin 46b arranged between the adjacent pair of heat conducting tubes, with a lower end of the further secondary fin 46b inclining with respect to the vertical direction. The secondary fins 46b are mainly used to enhance the material overturning and the heat transmission, therefore the heat from the heat conducting tubes may be transmitted to the material falling space between the heat conducting tubes, in which the temperatures of the material tend to be uniform, and the gas generated in a heating process of the material can be discharged more rapidly.

Specifically, referring to FIG. 4, a plurality of fins are also arranged between the heat conducting medium introducing portions, such that even when the material reaches spaces among the heat conducting medium introducing portions, the material can be overturned and the heat can be transmitted. Therefore, the gas generated in the heat conducting medium introducing portions can be discharged in a timely manner and a uniform heat transmission can be implemented.

A center exhaust passage 51 is arranged at a center of the housing, and looped exhaust passages 52 are arranged at a periphery of the outermost heat conducting tubes. The exhaust passages 52 and the center exhaust passage 51 communicate with an exhaust end 53 via an exhaust manifold to discharge the gas. As illustrated in FIG. 4, the center exhaust passage extends to a location where the heat conducting medium introducing portion is situated, such that the gas generated by the material at the heat conducting medium introducing portions can be discharged. An upper end of each of the exhaust manifolds and an upper end of the center exhaust passage is of a spire shape, and such a shape may facilitate the falling of the material. An upper exhaust port 6 is arranged on the housing near the material feeding hopper, for discharging the steam generated by the coal just entering the housing.

The material feeding hopper 2 includes an upper material feeding section 21, a middle material feeding section 22 and a lower material feeding section 23 which are arranged in the longitudinal direction. The middle material feeding section 22 has an opening diameter smaller than both that of the upper material feeding section 21 and than that of the lower material feeding section 23. The opening diameter of the upper material feeding section 21 is gradually decreased from top to bottom. The opening diameter of the lower material feeding section 23 is gradually increased from top to bottom. The material feeding hopper 2 having such a structure facilitates in blocking the gas, so as to strengthen the upgrading effect.

The material discharging hopper 3 includes an upper material discharging section 31 and a lower material discharging section 32. The upper material discharging section 31 consists of a plurality of sub-hoppers arranged horizontally, which may ensure that the material is discharged uniformly, so as to avoid the quality of coal being affected due to the blocking in the material discharging process. A water cooling wall is arranged at an outer side of the lower material discharging section 32 to realize a cooling water circulation via a water inlet tube and a water outlet tube, thereby lowering the temperature of the discharged material and protecting an apparatus for further treating from being damaged by the high-temperature material. Furthermore, the sub-hoppers may also function as transition so as to prevent the high-temperature material from directly contacting the water cooling wall in the lower material discharging section.

The apparatus for manufacturing high-quality coal products in this embodiment further includes a temperature controlling mechanism arranged at the material feeding hopper. The temperature control mechanism includes:

a temperature sensor (not shown) configured to acquire a temperature signal at each of the heat conducting medium discharging portions;

a controller configured to compare the temperature signal with a preset temperature value, and send a temperature controlling instruction according to a comparison result; and a regulating valve 7 arranged in a discharging portion of each of the heat conducting units and configured to regulate a valve opening in response to the temperature controlling instruction.

By means of the temperature controlling mechanism, temperatures in the housing may be regulated in a timely manner, and tend to be uniform and to be same as the preset temperature, so as to ensure that desired products may be finally obtained.

The heat conducting medium discharging portions 43 are of a straight plate shape as a whole, with a spire-shaped top having a certain inclination, which may smooth the material feeding.

Specifically, the heat conducting medium introducing portions 44 are of a straight plate shape as a whole, with a spire-shaped top having a certain inclination, which may facilitate the material falling.

In this embodiment, only two series of exhaust passages, i.e., the center exhaust passage and the peripheral exhaust passages, are arranged. In practice, more series of exhaust passages may be arranged in a direction extending out from the center of the housing in view of the number of the heat conducting tubes, such that the gas generated in the heating process can be discharged in a timely manner without affecting the upgrading effect.

In this embodiment, there are five heat conducting units, and each of the heat conducting units has five heat conducting tubes except for the heat conducting unit located in the center. These conducting tubes are distributed in array. In other embodiments, the number of the heat conducting tubes may be less or more than that in this embodiment on practical requirements.

In this embodiment, each component is arranged in such a manner that can facilitate the material falling and the gas discharging, such that in the coal treating process, the temperature of the material in the material falling space can be controlled flexibly and effectively, thereby achieving a good treatment effect.

The heat conducting medium is a hot gas in this embodiment.

Figure 12:
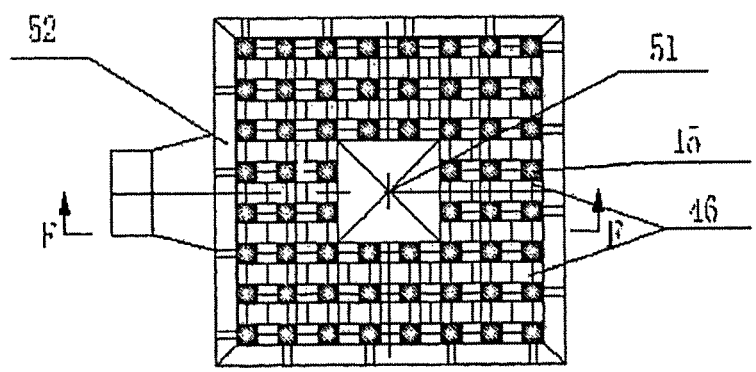
FIG. 12 is a top view showing the layout of heat conducting tubes and fins in an apparatus for manufacturing high-quality coal products according to a second embodiment of the present application.
Figure 13:
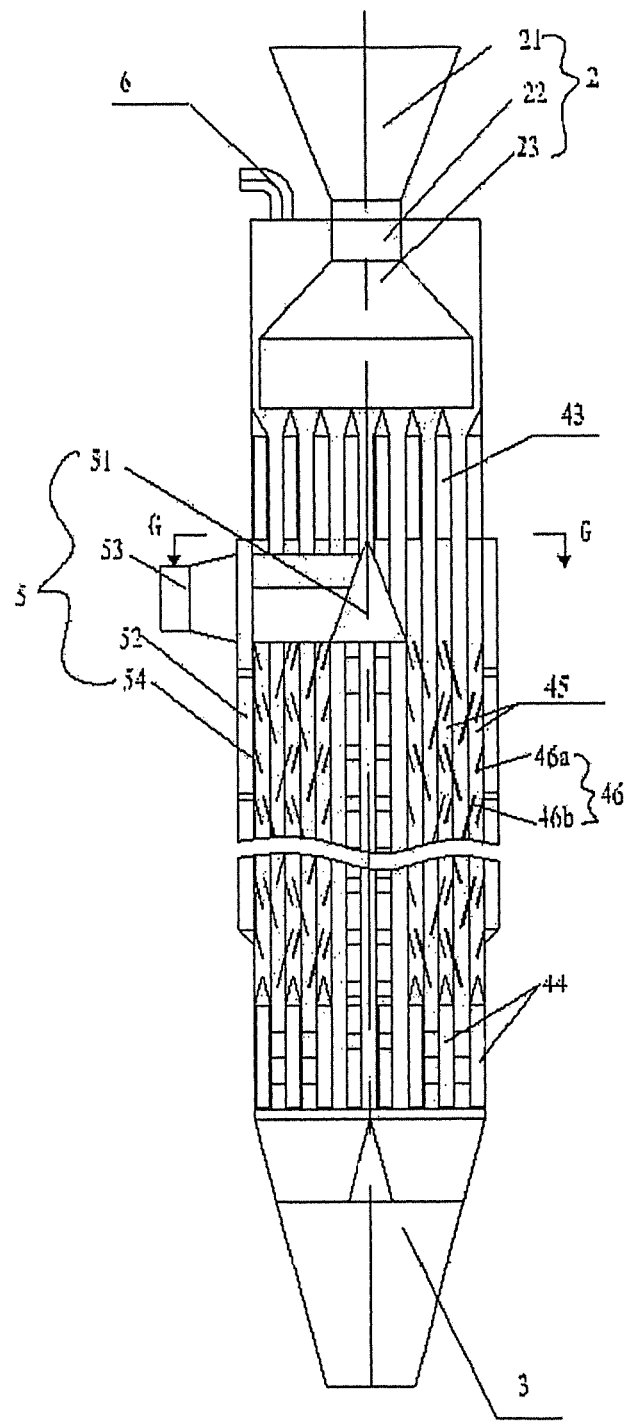
FIG. 13 is a schematic sectional view taken along line F-F in FIG. 12.
Figure 14:
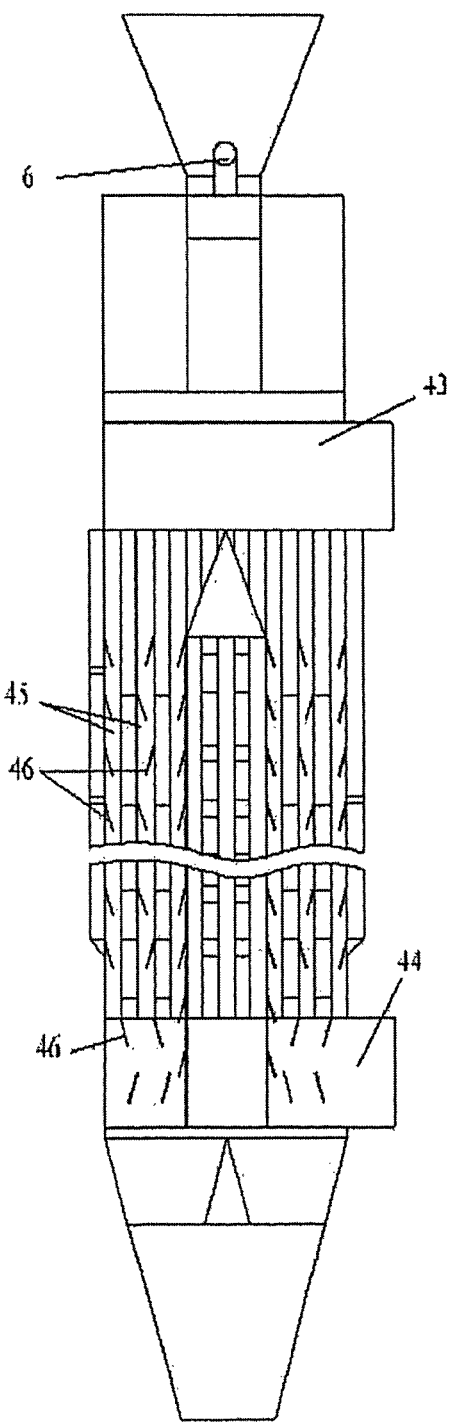
FIG. 14 is a side view of FIG. 13.
Figure 15:
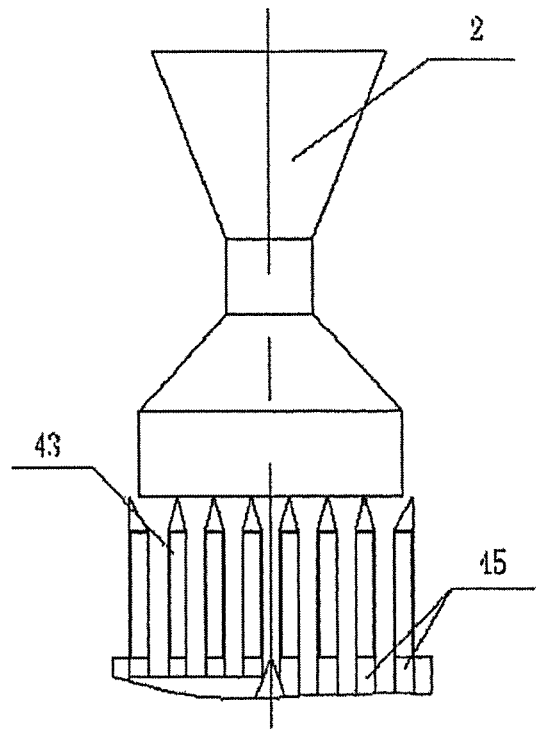
FIG. 15 is a structural view of a material feeding portion and a heat conducting medium outlet portion in FIG. 13 (an arrow indicates a discharging direction of the heat conducting medium in FIG. 15)
Figure 16:
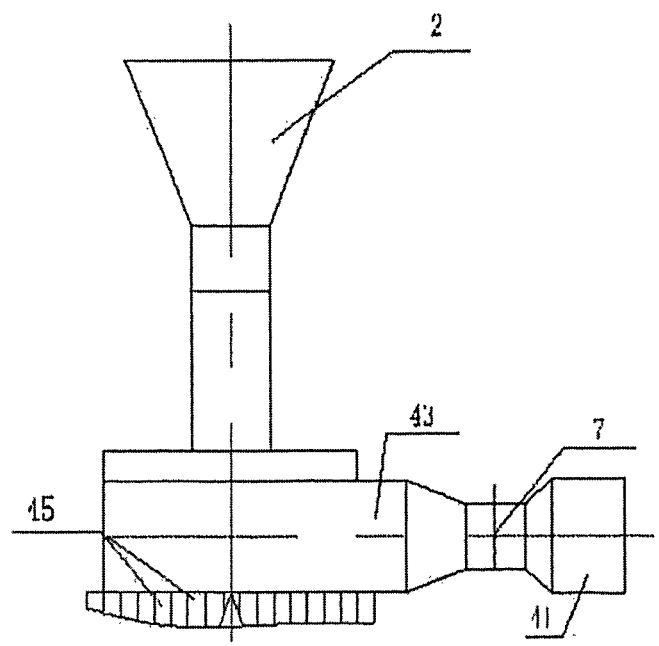
FIG. 16 is a side view of FIG. 15.
Figure 17:
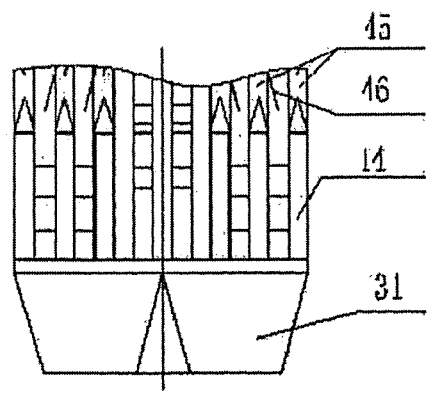
FIG. 17 is a structural view of a material discharging portion and a heat conducting medium inlet portion in FIG. 13 (an arrow indicates an introducing direction of the heat conducting medium in FIG. 17)
Figure 18:
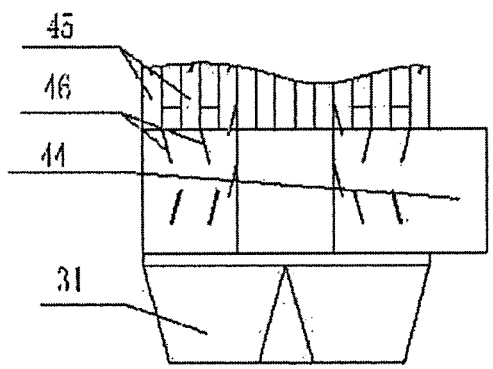
FIG. 18 is a side view of FIG. 17 (an arrow indicates a material discharging direction in FIG. 18)

The Apparatus for Manufacturing High-Quality Coal Products According to a Second Embodiment Reference is made to FIGS. 12 to 18. FIG. 12 is a schematic sectional view taken along line G-G in FIG. 13. FIG. 13 is a schematic sectional view taken along line F-F in FIG. 12. This embodiment differs from the first embodiment in that eight heat conducting units are arranged, and except for two heat conducting units located in the center, each of the heat conducting units includes eight heat conducting tubes. Primary fins between the heat conducting tubes adjacent to the exhaust passage in this embodiment are provided in the same arrangement as those in the first embodiment, however, two groups of primary fins are arranged longitudinally between each of the other heat conducting tubes and its adjacent heat conducting tube. One group is arranged at one side of a space between the two heat conducting tubes, and each of the primary fins in this group has a lower end inclining in a direction closing to a centerline of the housing. The other group is arranged at the other side of the space between the two heat conducting tubes, and each of the primary fins in this group has a lower end inclining in a direction away from the centerline of the housing. The two groups of primary fins are arranged alternately in the longitudinal direction. This arrangement of the primary fins may better facilitate the gas discharging and the material overturning.

In this embodiment, two groups of secondary fins are arranged in the longitudinal direction between the heat conducting tubes located in the center. One group is arranged at one side of a space between the two heat conducting tubes, and each of the secondary fins in this group has a lower end inclining in the direction closing to the centerline of the housing. The other group is arranged at the other side of the space between the two heat conducting tubes, and each of the secondary fins in this group has a lower end inclining in the direction away from the centerline of the housing. The two groups of secondary fins are arranged alternately in a longitudinal direction. This arrangement of the secondary fins may better facilitate the gas discharging and the material overturning. Other arrangements in this embodiment are the same as those of the first embodiment, which is not described here.

Figure 19:
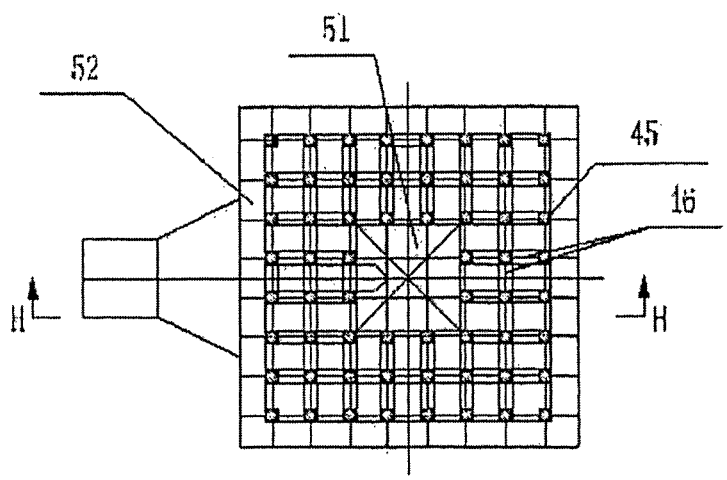
FIG. 19 is a top view showing the layout of heat conducting tubes and fins in an apparatus for manufacturing high-quality coal products according to a third embodiment of the present application.
Figure 20:
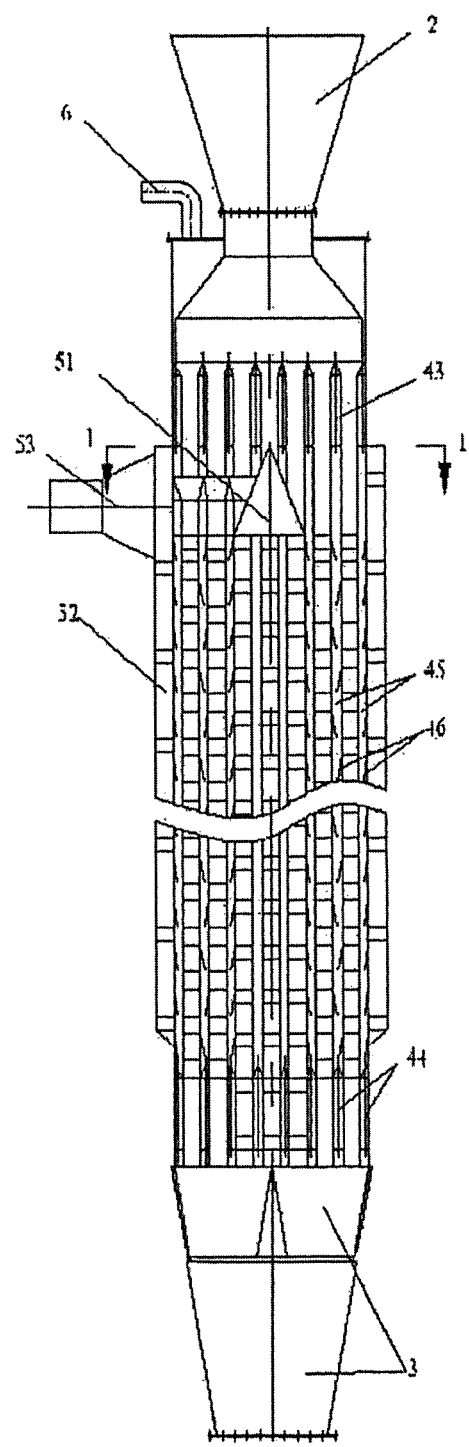
FIG. 20 is a schematic sectional view taken along line H-H in FIG. 19.
Figure 21:
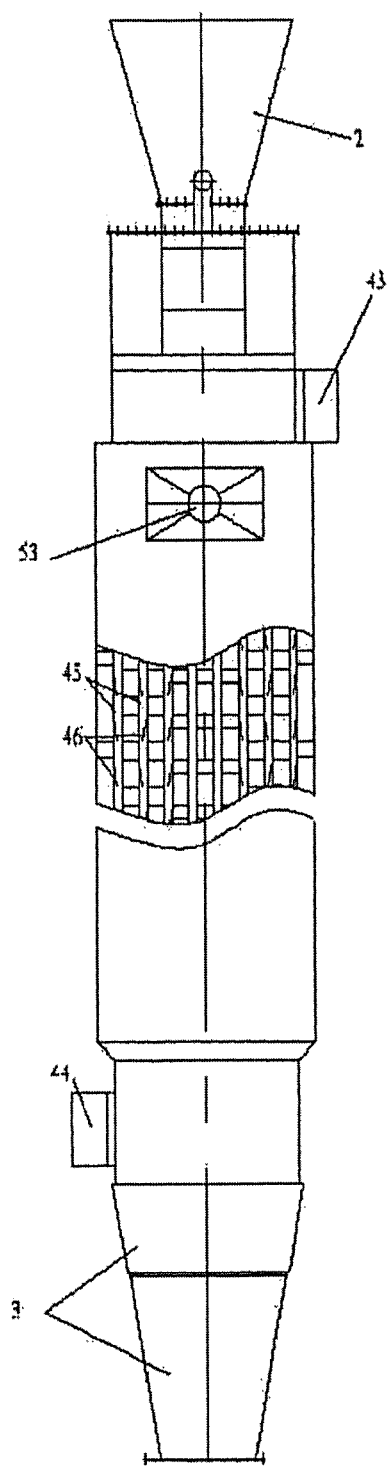
FIG. 21 is a side view of FIG. 20.
Figure 22:
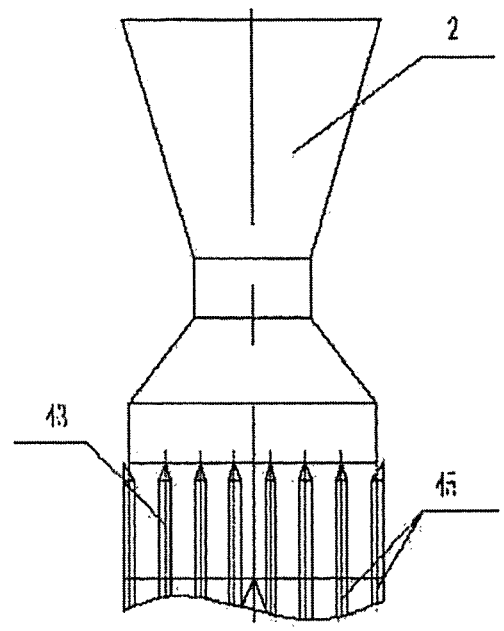
FIG. 22 is a structural view of a material feeding portion and a heat conducting medium outlet portion in FIG. 20 (an arrow indicates a discharging direction of the heat conducting medium in FIG. 22)
Figure 23:
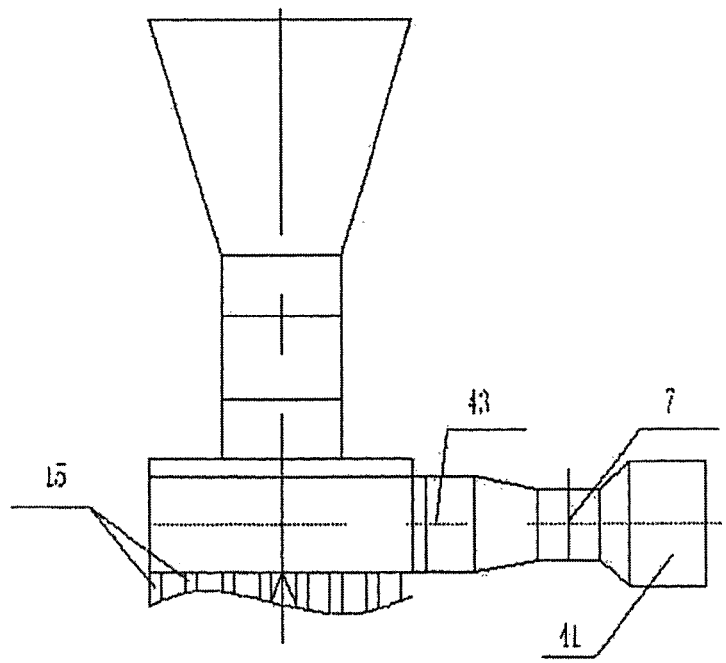
FIG. 23 is a side view of FIG. 22.
Figure 24:
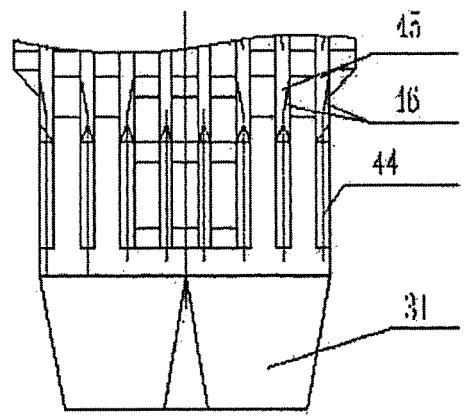
FIG. 24 is a structural view of a material discharging portion and a heat conducting medium inlet portion in FIG. 20 (an arrow indicates an introducing direction of the heat conducting medium in FIG. 24)
Figure 25:
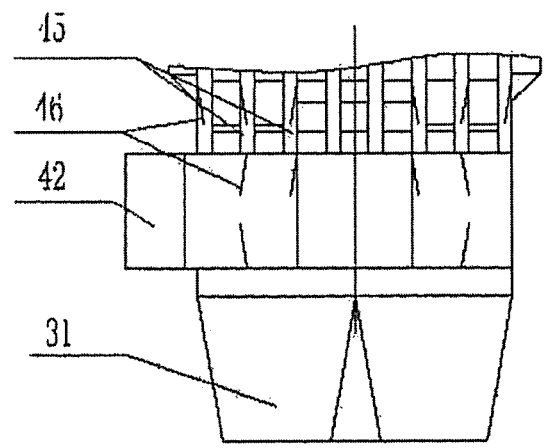
FIG. 25 is a side view of FIG. 24 (an arrow indicates a material discharging direction in FIG. 25)

The Apparatus for Manufacturing High-Quality Coal Products According to a Third Embodiment Reference is made to FIGS. 19 to 25. FIG. 19 is a schematic sectional view taken along line H-H in FIG. 20. This embodiment differs from the second embodiment in that only primary fins are arranged. Other arrangements in this embodiment are the same as those of the second embodiment, which is not described in detail here.

Figure 26:
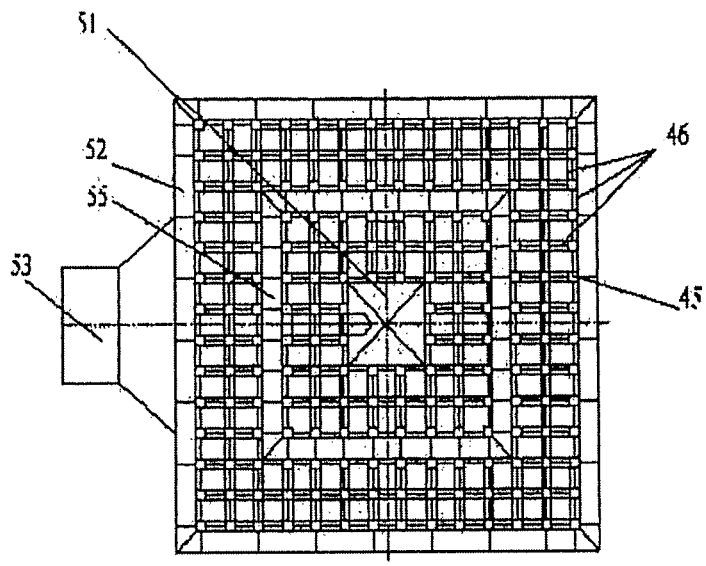
FIG. 26 is a top view showing the layout of heat conducting tubes and fins in an apparatus for manufacturing high-quality coal products according to a fourth embodiment of the present application.

The Apparatus for Manufacturing High-Quality Coal Products According to a Fourth Embodiment Referring to FIG. 26, this embodiment differs from the third embodiment in that more heat conducting units, i.e., sixteen heat conducting units, are arranged in this embodiment, and each of the heat conducting units includes sixteen heat conducting tubes except for two heat conducting units located in the center, and a looped exhaust passage 55 is arranged correspondingly between the center exhaust passage 51 and the looped exhaust passage 52 besides the center exhaust passage 51 located in the center of the housing and an looped exhaust passage 52 located at the periphery of the outermost heat conducting tubes, hence the apparatus for manufacturing high-quality coal products according to this embodiment is capable of facilitating the gas discharging and improving the upgrading effect.

Figure 27:
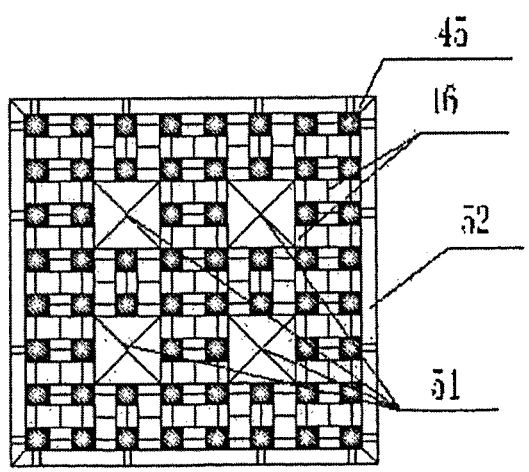
FIG. 27 is a top view showing the layout of heat conducting tubes and fins in an apparatus for manufacturing high-quality coal products according to a fifth embodiment of the present application.

The Apparatus for Manufacturing High-Quality Coal Products According to a Fifth Embodiment Referring to FIG. 27, this embodiment differs from the second embodiment in that four center exhaust passages 51 and one looped exhaust passage 52 located at the periphery of the outermost heat conducting tubes are arranged, and the four center exhaust passages 51 are symmetrically arranged with respect to the centerline of the housing so as to facilitate the gas discharging and improve the upgrading effect.

Figure 28:
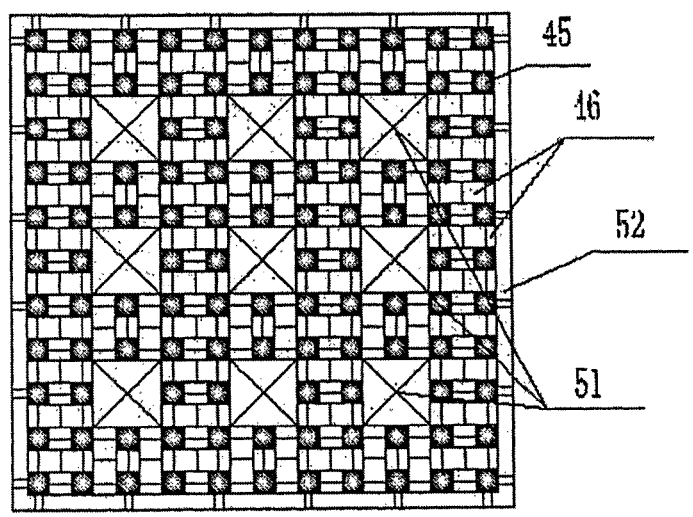
FIG. 28 is a top view showing the layout of heat conducting tubes and fins in an apparatus for manufacturing high-quality coal products according to a sixth embodiment of the present application.

The Apparatus for Manufacturing High-Quality Coal Products According to a Sixth Embodiment Referring to FIG. 28, this embodiment differs from the second embodiment in that more heat conducting units, i.e., eleven heat conducting units, are arranged, that except for three heat conducting units, each of the other heat conducting units includes eleven heat conducting tubes, and that six center exhaust passages 51 and one looped exhaust passages 52 located at the periphery of the outermost heat conducting tubes are arranged correspondingly, hence the apparatus for manufacturing high-quality coal products according to this embodiment is capable of facilitating the gas discharging and improving the upgrading effect.

In other embodiments, more series of exhaust passages may be arranged in practice.

Hereinafter, treatment effects of the apparatus and system for manufacturing high-quality coal products according to the present application are verified through specific tests.

I. Taking the Brown Coal as a Sample

1. Inner Mongolia raw brown coal is crushed and fed into the apparatus for manufacturing high-quality coal products according to the first embodiment of the present application for upgrading, and samples of the raw brown coal and corresponding upgraded coal are both delivered to SGS-CSTC standards technical services co., LTD (abbreviated as SGS) for detection and analysis, and a detection report pursuant to the detection result is made as follows.

1) Raw Coal

| test item | symbol | unit | as received basis (ar) | air dried basis (ad) | dry basis (d) | dry-ash-free basis (daf) | standard |
|---|---|---|---|---|---|---|---|
| total moisture | $M_t$ | % | 43.6 | | | | GB/T211-2007 |
| air dried moisture | $M_{ad}$ | % | | 19.33 | | | GB/T212-2008 |
| ash content | A | % | 7.58 | 10.84 | 13.44 | | GB/T212-2008 |
| volatile content | V | % | 21.67 | 31 | 38.43 | 44.89 | GB/T212-2008 |
| coke residue characteristics | CRC | | | | 2 | | GB/T212-2008 |
| fixed carbon | FC | % | | 38.83 | | | GB/T212-2008 |
| total sulfur | $S_t$ | % | 0.91 | 1.30 | 1.61 | | GB/T214-2007 |
| hydrogen content | H | % | | | 3.22 | 3.99 | GB/T476-2008 |
| gross calorific value | $Q_{gr}$ | MJ/KG | | | 19.28 | 23.90 | GB/T213-2008 |
| net calorific value | $Q_{net}$ | MJ/KG | 12.01 | 18.17 | | | |

Remarks:
1. Net calorific value as received basis $Q_{net,\,ar}$ is equivalent to 2872 Kcal/Kg;
2. Gross calorific value as air dried basis $Q_{gr,\,ad}$ is equivalent to 4611 Kcal/Kg.

2) Upgraded Coal at the Temperature of 650 Degree Celsius

| test item | symbol | unit | as received basis (ar) | air dried basis (ad) | dry basis (d) | dry ash-free basis (daf) | standard adopted |
|---|---|---|---|---|---|---|---|
| total moisture | $M_t$ | % | 9.2 | / | / | / | GB/T211-2007 |
| air dried moisture | $M_{ad}$ | % | / | 10.88 | / | / | GB/T212-2008 |
| ash content | A | % | 16.24 | 15.94 | 17.89 | | GB/T212-2008 |
| volatile content | V | % | 26.86 | 26.36 | 29.58 | 36.02 | GB/T212-2008 |
| coke residue characteristics | CRC | / | | 2 | | | GB/T212-2008 |
| fixed carbon | FC | % | / | 46.82 | / | / | GB/T212-2008 |
| total sulfur | $S_t$ | % | 1.80 | 1.77 | 1.99 | / | GB/T214-2007 |
| hydrogen content | H | % | / | 2.83 | 3.18 | / | GB/T476-2008 |
| gross calorific value | $Q_{gr}$ | MJ/KG | | 21.74 | 24.39 | / | GB/T213-2008 |
| net calorific value | $Q_{net}$ | MJ/KG | 21.34 | 20.91 | / | / | |

Remarks:
1. Net calorific value as received basis $Q_{net,ar}$ is equivalent to 5103 Kcal/Kg;
2. Gross calorific value as air dried basis $Q_{gr,ad}$ is equivalent to 5199 Kcal/Kg.

The detection result shows that, the net calorific value as received basis of the raw coal may be increased from 2872 Kcal/Kg to 5103 Kcal/Kg, and the total moisture may be reduced from 43.6% to 9.2% at the treatment temperature of 650 degree Celsius.

2. A brown coal sample is crushed and fed into the apparatus for manufacturing high-quality coal products according to the third embodiment of the present application for upgrading at respective upgrading temperatures of 330 degree Celsius, 450 degree Celsius, 550 degree Celsius, 650 degree Celsius, 850 degree Celsius, 950 degree Celsius and 1050 degree Celsius; data of the upgraded coals acquired at the temperatures of 330 degree Celsius, 450 degree Celsius, 550 degree Celsius and 650 degree Celsius are recorded, then the raw coal and the upgraded coals acquired at those temperatures are detected, and consequently the detection result is shown in table 1.

Applicant analyses the above test and detection data and obtains the analysis result as shown in table 2.

TABLE 2

Analysis result table

| coal sample | fed material weight/ kg | discharged material weight/ kg | filtrate weight/ g | weight loss rate/% | raw coal/ upgraded coal | condensed water yield/% |
|---|---|---|---|---|---|---|
| upgrading at 330 degree Celsius | 5000 | 2642 | N/A | 6.76 | 1.89 | 40.40 |
| upgrading at 450 degree Celsius | 4500 | 2144 | 41 | 12.27 | 2.10 | 39.18 |
| upgrading at 550 degree Celsius | 4500 | 1698 | 65 | 17.51 | 2.65 | 43.31 |

TABLE 1

Detection result table

| coal sample | total moisture/ % | air dried moisture/ % | net calorific value as received basis (Kcal/kg) | gross calorific value as air dried basis (Kcal/kg) | Ash content/ % | volatile content/ % | fixed carbon/ % | total sulfur/ % | hydrogen content/ % |
|---|---|---|---|---|---|---|---|---|---|
| raw coal | 43.40 | 12.47 | 3101 | 5364 | 1.76 | 43.52 | 42.25 | 0.1 | 4.03 |
| upgrading at 330 degree Celsius | 0.4 | 5.12 | 6308. | 6215 | 1.95 | 42.82 | 50.11 | 0.1 | 4.14 |
| upgrading at 450 degree Celsius | 0.80 | 3.22 | 6701 | 6729 | 2.95 | 33.94 | 59.89 | 0.0 | 3.83 |
| upgrading at 550 degree Celsius | 0.50 | 3.66 | 7256 | 7177 | 2.50 | 20.82 | 73.02 | 0.0 | 3.03 |
| upgrading at 650 degree Celsius | 0.20 | 1.95 | 7775 | 7772 | 3.06 | 12.55 | 82.44 | 0.0 | 2.69 |

TABLE 2-continued

Analysis result table

| coal sample | fed material weight/ kg | discharged material weight/ kg | filtrate weight/ g | weight loss rate/% | raw coal/ upgraded coal | condensed water yield/% |
|---|---|---|---|---|---|---|
| upgrading at 650 degree Celsius | 4500 | 1526 | 136 | 17.73 | 2.95 | 45.33 |

The above detection result shows that raw coal quantity required for manufacturing solid products per ton and the net calorific value of the products rises as the upgrading temperature rises, substantially in a linear relationship. A proportion of the calorific value remaining in the solid products to the raw coal is decreased. Applicant obtains the following conclusions during the test and detection process.

1. The test record shows that the production rate of the solid products decreases, the weight loss increases contrarily, the volatile content in the solid product decreases from 42.85% at 330 degree Celsius to 12.55% at 650 degree Celsius, however the condensed water yield changes a little, as the temperature rises. Thus, the weight loss is mainly resulted by the volatile content, which may be recycled in subsequent processes, as the temperature rises.

2. The volatile content in the products decreases as the upgrading temperature rises. The losing volatile content may be separated out as combustible gas and tar, which may be recycled.

3. The above detection result shows that effective content in brown coal can be recycled to the utmost extent and the amount of the effective content remaining in the solid products and the amount of the effective content entering the coal chemical process can be controlled by utilizing the apparatus for manufacturing high-quality coal according to the present application.

Samples of the upgraded coal treated by the apparatus for manufacturing high-quality coal according to the third embodiment of the present application at various temperatures are delivered to SGS-CSTC standards technical services co., LTD (abbreviated as SGS) for detection and analysis, and a detection report pursuant to the detection result is made as follows.

1) Upgraded Coal at the Temperature of 450 Degree Celsius

| test item | symbol | unit | as received basis (ar) | air dried basis (ad) | dry basis (d) | dry ash-free basis (daf) | standard adopted |
|---|---|---|---|---|---|---|---|
| total moisture | Mt | % | 0.8 | / | / | / | GB/T211-2007 |
| air dried moisture | Mad | % | / | 3.22 | / | / | GB/T212-2008 |
| ash content | A | % | 3.02 | 2.95 | 3.05 | / | GB/T212-2008 |
| volatile content | V | % | 34.79 | 33.93 | 35.07 | 36.17 | GB/T212-2008 |
| coke residue characteristics | CRC | / | | 2 | | | GB/T212-2008 |
| fixed carbon | FC | % | / | 58.89 | / | / | GB/T212-2008 |
| total sulfur | St | % | 0.07 | 0.07 | 0.07 | / | GB/T214-2007 |
| hydrogen content | H | % | / | 3.83 | 3.96 | / | GB/T476-2008 |
| gross calorific value | Qgr | MJ/KG | / | 28.14 | 29.08 | / | GB/T213-2008 |
| net calorific value | Qnet | MJ/KG | 28.02 | 27.28 | / | / | |

Remarks:
1. Net calorific value as received basis Qnet, ar is is equivalent to 6701 Kcal/Kg.
2. Gross calorific value as air dried basis Qgr, ad is equivalent to 6729 Kcal/Kg.

The above detection result shows that the net calorific value as received basis of the raw coal may be increased from 3101 Kcal/kg to 6701 Kcal/kg and the total moisture may be decreased from 43.40% to 0.8% at the treatment temperature of 450 degree Celsius.

2) Upgraded Coal at the Temperature of 550 Degree Celsius

| test item | symbol | unit | as received basis (ar) | air dried basis (ad) | dry basis (d) | dry ash-free basis (daf) | standard adopted |
|---|---|---|---|---|---|---|---|
| total moisture | $M_t$ | % | 0.5 | / | / | / | GB/T211-2007 |
| air dried moisture | $M_{ad}$ | % | / | 3.66 | / | / | GB/T212-2008 |
| ash content | A | % | 2.58 | 2.50 | 2.59 | / | GB/T212-2008 |
| volatile content | V | % | 21.50 | 20.82 | 21.61 | 22.19 | GB/T212-2008 |
| coke residue characteristics | CRC | / | | 2 | | | GB/T212-2008 |
| fixed carbon | FC | % | / | 73.02 | / | / | GB/T212-2008 |
| total sulfur | $S_t$ | % | 0.07 | 0.07 | 0.07 | / | GB/T214-2007 |
| hydrogen content | H | % | / | 3.03 | 3.15 | / | GB/T476-2008 |
| gross calorific value | $Q_{gr}$ | MJ/KG | / | 30.01 | 31.15 | / | GB/T213-2008 |

-continued

| test item | symbol | unit | as received basis (ar) | air dried basis (ad) | dry basis (d) | dry ash-free basis (daf) | standard adopted |
|---|---|---|---|---|---|---|---|
| net calorific value | $Q_{net}$ | MJ/KG | 30.34 | 29.30 | / | / | |

Remarks:
1. Net calorific value as received basis $Q_{net, ar}$ is is equivalent to 7255 Kcal/Kg.
2. Gross calorific value as air dried basis $Q_{gr, ad}$ is equivalent to 7177 Kcal/Kg.

The above detection result shows that the net calorific value as received basis of the raw coal may be increased from 3101 Kcal/kg to 7255 Kcal/kg and the total moisture may be decreased from 43.40% to 0.5% at the treatment temperature of 550 degree Celsius.

3) Upgraded Coal at the Temperature of 650 Degree Celsius

| test item | symbol | unit | as received basis (ar) | air dried basis (ad) | dry basis (d) | dry ash-free basis (daf) | standard adopted |
|---|---|---|---|---|---|---|---|
| total moisture | $M_t$ | % | 0.5 | / | / | / | GB/T211-2007 |
| air dried moisture | $M_{ad}$ | % | / | 1.95 | / | / | GB/T212-2008 |
| ash content | A | % | 3.11 | 3.06 | 3.12 | / | GB/T212-2008 |
| volatile content | V | % | 12.77 | 12.55 | 12.80 | 13.21 | GB/T212-2008 |
| coke residue characteristics | CRC | / | | 2 | | | GB/T212-2008 |
| fixed carbon | FC | % | / | 82.44 | / | / | GB/T212-2008 |
| total sulfur | $S_t$ | % | 0.09 | 0.09 | 0.09 | / | GB/T214-2007 |
| hydrogen content | H | % | / | 2.69 | 2.74 | / | GB/T476-2008 |
| gross calorific value | $Q_{gr}$ | MJ/KG | / | 32.50 | 33.15 | / | GB/T213-2008 |
| net calorific value | $Q_{net}$ | MJ/KG | 32.51 | 31.90 | / | / | |

Remarks:
1. Net calorific value as received basis $Q_{net, ar}$ is is equivalent to 7775 Kcal/Kg.
2. Gross calorific value as air dried basis $Q_{gr, ad}$ is equivalent to 7772 Kcal/Kg.

The above detection result shows that the net calorific value as received basis of the raw coal may be increased from 3101 Kcal/kg to 7775 Kcal/kg and the total moisture may be decreased from 43.40% to 0.2% at the treatment temperature of 650 degree Celsius.

4) Upgraded Coal at the Temperature of 950 Degree Celsius

| test item | symbol | unit | air dried basis (ad) | dry basis (d) | dry ash-free basis (daf) | standard adopted |
|---|---|---|---|---|---|---|
| air dried moisture | $M_{ad}$ | % | 13.86 | / | / | GB/T212-2008 |
| ash content | A | % | 6.08 | 7.06 | | GB/T212-2008 |
| volatile content | V | % | 4.91 | 5.70 | 6.13 | GB/T212-2008 |
| coke residue characteristics | CRC | / | | 2 | | GB/T212-2008 |
| fixed carbon | FC | % | 75.15 | / | / | GB/T212-2008 |
| total sulfur | $S_t$ | % | 0.22 | 0.26 | / | GB/T214-2007 |
| hydrogen content | H | % | 0.26 | 0.30 | / | GB/T476-2008 |
| gross calorific value | $Q_{gr}$ | MJ/KG | 26.15 | 30.36 | / | GB/T213-2008 |
| net calorific value | $Q_{net}$ | MJ/KG | 25.78 | / | / | |

Remarks:
Gross calorific value as air dried basis $Q_{gr, ad}$ is equivalent to 6254 Kcal/Kg.

The above detection result shows that the gross calorific value as air dried basis of the raw coal may be increased from 5364 Kcal/kg to 6254 Kcal/kg, the content of fixed carbon may be increased from 42.25% to 75.15%, and the volatile content is decreased from 25.17% to 4.91% at the treatment temperature of 950 degree Celsius.

5) Upgraded Coal Obtained by the Apparatus for Manufacturing High-Quality Coal products according to the present application at the temperature of 1050 degree Celsius.

| test item | symbol | unit | air dried basis (ad) | dry basis (d) | dry ash-free basis (daf) | standard adopted |
|---|---|---|---|---|---|---|
| air dried moisture | $M_{ad}$ | % | 12.56 | / | / | GB/T212-2008 |
| ash | A | % | 4.55 | 5.20 | / | GB/T212-2008 |
| volatile content | V | % | 3.53 | 4.04 | 4.26 | GB/T212-2008 |
| coke residue characteristics | CRC | / | | 2 | | GB/T212-2008 |
| fixed carbon | FC | % | 79.36 | / | / | GB/T212-2008 |
| total sulfur | $S_t$ | % | 0.18 | 0.21 | / | GB/T214-2007 |
| hydrogen content | H | % | <0.01 | 0.01 | / | GB/T476-2008 |
| gross calorific value | $Q_{gr}$ | MJ/KG | 27.18 | 31.08 | / | GB/T213-2008 |
| net calorific value | $Q_{net}$ | MJ/KG | 26.90 | / | / | |

Remarks: Gross calorific value as air dried basis $Q_{gr, ad}$ is equivalent to 6500 Kcal/Kg.

The above detection result shows that the gross calorific value as air dried basis of the raw coal may be increased from 5364 Kcal/kg to 6500 Kcal/kg, the content of fixed carbon may be increased from 42.25% to 79.36%, and the volatile content is decreased from 25.17% to 3.53% at the treatment temperature of 1050 degree Celsius.

II. Taking the Bituminous Coal as a Sample

Raw bituminous coal, which is not upgraded by the apparatus for manufacturing high-quality coal products according to the present application, is taken as a sample for detection, and a detection result is as follows.

| test item | symbol | unit | as received basis (ar) | air dried basis (ad) | dry basis (d) | dry ash-free basis (daf) | standard adopted |
|---|---|---|---|---|---|---|---|
| total moisture | $M_t$ | % | 3.8 | / | / | / | GB/T211-2007 |
| air dried moisture | $M_{ad}$ | % | / | 1.50 | / | / | GB/T212-2008 |
| ash content | A | % | 10.87 | 11.13 | 11.30 | | GB/T212-2008 |
| volatile content | V | % | 31.55 | 32.30 | 32.79 | 36.97 | GB/T212-2008 |
| coke residue characteristics | CRC | / | | 7 | | | GB/T212-2008 |
| fixed carbon | FC | % | / | 55.07 | / | / | GB/T212-2008 |
| total sulfur | $S_t$ | % | 0.31 | 0.32 | 0.32 | / | GB/T214-2007 |
| hydrogen content | H | % | / | 4.68 | 4.75 | / | GB/T476-2008 |
| gross calorific value | $Q_{gr}$ | MJ/KG | / | 30.91 | 31.38 | | GB/T213-2008 |
| net calorific value | $Q_{net}$ | MJ/KG | 29.16 | 29.91 | / | / | |

Remarks:
1. Net calorific value as received basis $Q_{net,\,ar}$ is equivalent to 6973 Kcal/Kg.
2. Gross calorific value as air dried basis $Q_{gr,\,ad}$ is equivalent to 7392 Kcal/Kg.

The raw bituminous coal upgraded by the apparatus for manufacturing high-quality coal products according to the present application at the temperature of 950 degree Celsius is taken as a sample for detection, and a detection result is as follows.

| test item | symbol | unit | as received basis (ar) | air dried basis (ad) | dry basis (d) | dry ash-free basis (daf) | standard adopted |
|---|---|---|---|---|---|---|---|
| total moisture | $M_t$ | % | 0.1 | / | / | / | GB/T211-2007 |
| air dried moisture | $M_{ad}$ | % | / | 0.21 | / | / | GB/T212-2008 |
| ash content | A | % | 16.47 | 16.45 | 16.48 | / | GB/T212-2008 |
| volatile content | V | % | 1.12 | 1.12 | 1.12 | 1.34 | GB/T212-2008 |
| coke residue characteristics | CRC | / | | 2 | | | GB/T212-2008 |
| fixed carbon | FC | % | / | 82.22 | / | / | GB/T212-2008 |
| total sulfur | $S_t$ | % | 0.24 | 0.24 | 0.24 | / | GB/T214-2007 |
| hydrogen content | H | % | / | 0.37 | 0.37 | / | GB/T476-2008 |
| gross calorific value | $Q_{gr}$ | MJ/KG | / | 28.23 | 28.29 | / | GB/T213-2008 |
| net calorific value | $Q_{net}$ | MJ/KG | 28.18 | 28.15 | / | / | |

Remarks:
1. Net calorific value as received basis $Q_{net,\,ar}$ is equivalent to 6739 Kcal/Kg.
2. Gross calorific value as air dried basis $Q_{gr,\,ad}$ is equivalent to 6751 Kcal/Kg.

The above detection result shows that the total moisture of the raw bituminous coal may be decreased from 3.8% to 0.1%, the content of fixed carbon may be increased from 55.07% to 82.22%, and the volatile content may be decreased from 32.3% to 1.12% at the treatment temperature of 950 degree Celsius. The resultant products meet the standard of coke.

III. Taking the High Sulfur Bituminous Coal as a Sample

Raw high sulfur bituminous coal, which is not upgraded by the apparatus for manufacturing high-quality coal products according to the present application, is taken as a sample for detection, and a detection result is as follows.

| test item | symbol | unit | as received basis (ar) | air dried basis (ad) | dry basis (d) | dry ash-free basis (daf) | standard adopted |
|---|---|---|---|---|---|---|---|
| total moisture | $M_t$ | % | 1.1 | / | / | / | GB/T211-2007 |
| air dried moisture | $M_{ad}$ | % | / | 0.99 | / | / | GB/T212-2008 |
| ash content | A | % | 17.23 | 17.25 | 17.42 | / | GB/T212-2008 |
| volatile content | V | % | 25.14 | 25.17 | 25.42 | 30.79 | GB/T212-2008 |
| coke residue characteristics | CRC | / | | 7 | | | GB/T212-2008 |
| fixed carbon | FC | % | / | 56.59 | / | / | GB/T212-2008 |
| total sulfur | $S_t$ | % | 4.11 | 4.11 | 4.15 | / | GB/T214-2007 |
| hydrogen content | H | % | / | 4.01 | 4.05 | / | GB/T476-2008 |
| gross calorific value | $Q_{gr}$ | MJ/KG | / | 28.13 | 28.41 | / | GB/T213-2008 |
| net calorific value | $Q_{net}$ | MJ/KG | 27.25 | 27.28 | / | / | |

Remarks:
1. Net calorific value as received basis $Q_{net, ar}$ is is equivalent to 6517 Kcal/Kg.
2. Gross calorific value as air dried basis $Q_{gr, ad}$ is equivalent to 6727 Kcal/Kg.

The raw high sulfur bituminous coal upgraded by the apparatus for manufacturing high-quality coal products according to the present application at the temperature of 950 degree Celsius is taken as a sample for detection, and a detection result is as follows.

| test item | symbol | unit | air dried basis (ad) | dry basis (d) | dry ash-free basis (daf) | standard adopted |
|---|---|---|---|---|---|---|
| air dried moisture | $M_{ad}$ | % | 0.01 | / | / | GB/T212-2008 |
| ash content | A | % | 31.25 | 31.25 | / | GB/T212-2008 |
| volatile content | V | % | 1.18 | 1.18 | 1.72 | GB/T212-2008 |
| coke residue characteristics | CRC | / | | 2 | | GB/T212-2008 |
| fixed carbon | FC | % | 67.56 | / | / | GB/T212-2008 |
| total sulfur | $S_t$ | % | 3.79 | 3.79 | / | GB/T214-2007 |
| hydrogen content | H | % | 0.36 | 0.36 | / | GB/T476-2008 |
| gross calorific value | $Q_{gr}$ | MJ/KG | 24.72 | 24.72 | / | GB/T213-2008 |
| net calorific value | $Q_{net}$ | MJ/KG | 24.65 | / | / | |

Remarks:
1. Gross calorific value as air dried basis $Q_{gr, ad}$ is equivalent to 5912/Kg.
2. Since there is no difference between two balances, the total moisture cannot be provided.

The above detection result shows that the air dried moisture of the raw bituminous coal may be decreased from 1.1% to 0.01%, the content of fixed carbon may be increased from 56.59% to 67.56%, and the volatile content is decreased from 25.17% to 1.18% at the treatment temperature of 950 degree Celsius. The resultant products meet the standard of coke, with the decreased total sulfur of the raw coal 3.79% which is 4.11% in the raw coal.

A System for Manufacturing High-Quality Coal Products of a Preferred Embodiment The system for manufacturing high-quality coal products is illustrated hereinafter in detail in conjunction with embodiments.

Figure 29:
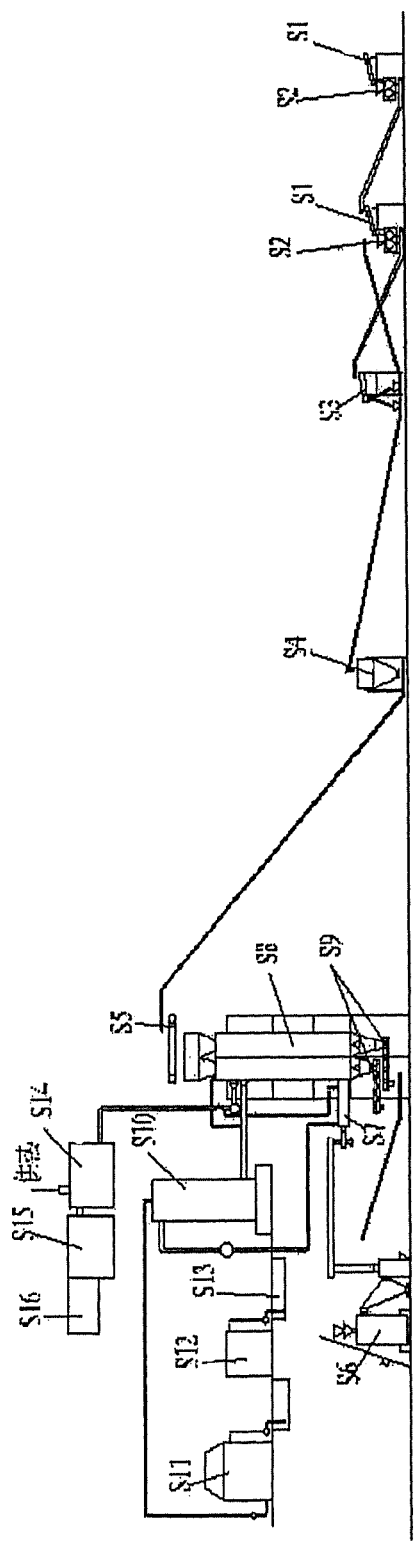
FIG. 29 is a schematic view showing the structure of a system for manufacturing high-quality coal products according to a preferred embodiment of the present application.

Referring to FIG. 29, the system for manufacturing high-quality coal products according to this embodiment includes a material supply mechanism, a heat conducting medium supply mechanism, an apparatus for manufacturing high-quality coal products, and a recycling apparatus.

The material supply mechanism includes:

two crushing mechanisms, each of which includes a vibration material feeder S1 and a double-geared crushing machine S2; and a linear sieve S3 configured to sieve crushed material, deliver the sieved material to a surge bin S4, and then to a belt conveyor S5 arranged at a material feeding port of the apparatus for manufacturing high-quality coal products.

The heat conducting medium supply mechanism includes a single-stage type coal gas furnace S6 and a coal gas burner S7. The single-stage type coal gas furnace is a coal gas generator, which produces gaseous fuel, i.e. coal gas, from solid coal. The coal gas burner burns the gaseous fuel, i.e. coal gas, to provide heat source for the whole system. The coal gas burner S7 according to this embodiment includes a front part and a rear part. The front part is a combustion chamber, and the rear part is an air mixing, steady flow and air discharging chamber. In this embodiment, four apparatus for manufacturing high-quality coal products S8 according to the present application are provided, the structure of which may be referred to the preceding embodiments and thus is not described in detail here. In the apparatus for manufacturing high-quality coal products, a screw material feeder S9 having a cooling mechanism is arranged at the material discharging port below the material discharging hopper. The screw material feeder S9 includes a housing, a material feeding port arranged above the housing, a material discharging port arranged below the housing, and a screw arranged in the housing. A rotation shaft of the screw is connected to a driving mechanism and is driven by the driving mechanism to rotate. A material discharging speed of the apparatus for manufacturing high-quality coal products may be controlled by a rotation speed of the screw. The rotation speed of the screw may determine a time of the material remaining in the apparatus for manufacturing high-quality coal products. An outer wall of the housing is provided with a water cooling wall, which can reduce the temperature of the material via the cooling water circulation during the convey of the material by the screw. In this case, the material discharged from the material discharging port may have a temperature lower than 100 degree Celsius.

The recycling apparatus according to this embodiment includes a spray tower S10 connected to a gas discharging end of the apparatus for manufacturing high-quality coal products, a water cooling tower S11, and a wastewater treatment pond S12, an oil-water separation pond S13, and a power generation mechanism connected to a heat conducting medium outlet of the apparatus for manufacturing high-quality coal products. The gas discharging end of the apparatus for manufacturing high-quality coal products communicates with the spray tower S10. The spray tower S10 is connected to both the heat conducting medium supply apparatus and the water cooling tower S11. The water cooling tower S11 is connected to the wastewater treatment pond. The wastewater treatment pond is connected to the oil-water separation pond. In the oil-water separation pond, tar is separated from water for recycling. The power generation mechanism includes a waste heat power generation boiler S14 connected to the heat conducting medium outlet, a steam turbine S15 connected to the waste heat power generation boiler S14, and a power generator S16 connected to the steam turbine. The water cooling tower, the oil-water separation pond and the spray tower are integrally formed. The spray tower mainly functions as cooling the self-generated high temperature gas. In the case that the high temperature gas is cooled to have a temperature lower than 100 degree, the oil vapor and the water vapor in the high temperature gas become liquid, which can be separated from the gaseous coal gas. The high temperature water from the spray tower is cooled by the water cooling tower to low temperature water, which then circulates back to the spray tower to cool the self-generated high temperature gas. The oil-water separation pond provides oil-free water for the water cooling tower and the spray tower. In other embodiments, the spray tower may be replaced by other cooling devices, such as a shell-and-tube heat exchanger. The heat conducting medium outlet has one end connected to the power generation mechanism and the other end connected to the coal gas burner S7, so that the heat conducting medium after being used to treat the coal can be recycled, one part of which is supplied to the coal gas burner for burning, and the rest heat is recycled for waste heat power generation. For preventing the high temperature gas generated in the combustion chamber from damaging the apparatus for manufacturing high-quality coal products due to direct entering into the apparatus, some low temperature gases are mixed into the air mixing, steady flow, and air discharging chamber of the coal gas burner before the high temperature gas enters the apparatus for manufacturing high-quality coal products. In this embodiment, these low temperature gases are the used heat conducting medium introduced back from the heat conducting medium outlet. Consequently, the proper temperature heat conducting medium can be provided to the apparatus for manufacturing high-quality coal products, and the waste heat of the high temperature gas at the heat conducting medium outlet can be utilized.

An opening is arranged, near the material feeding end, on the housing of the apparatus for manufacturing high-quality coal products. The opening is connected to the spray tower via a tube.

The tar separated from the oil-water separation pond is delivered to a coal chemical plant to be treated to a tar product.

Hereinafter, the heat that is generated in a process of treating the brown coal by the system for manufacturing high-quality coal products according to this embodiment is calculated.

Treatment capacity: 1 million tons per year=140 tons per hour.

In the treatment process, free water being vaporized is 27.062 tons per hour, and bound water being vaporized is 27.538 tons per hour.

$$Q = W \times C \times \Delta t$$

Q: quantity of heat KJ/h
W: mass flow of fluid kg/h
C: average specific heat of fluid KJ/(kg.°C.)
$\Delta t$: temperature difference °C.

Heat is calculated as follows for increasing the temperature of water from 20 degree Celsius to 280 degree Celsius.

For free water from 20 degree Celsius to 100 degree Celsius:

$$Q1 = W1 \times C1 \times \Delta t1 = 27062 \times 4.18 \times 80 = 9049532.8 \text{ KJ/h} = 2.164 \text{ million kCal/h};$$

For bound water from 20 degree Celsius to 100 degree Celsius:

$$Q2 = W2 \times C2 \times \Delta t2 = 25538 \times 4.18 \times 80 = 8539907.2 \text{ KJ/h} = 2.042 \text{ million kCal/h};$$

For bound water from 100 degree Celsius to 280 degree Celsius:

$$Q3 = W3 \times C3 \times \Delta t3 = 25538 \times 2.1 \times 180 = 9653364 \text{ KJ/h} = 2.309 \text{ million kCal/h};$$

Latent heat of vaporization of water of 54.6 t/h at the temperature of 100 degree Celsius:

$$Q4 = 123396000 \text{ KJ/h} = 29.51 \text{ million kCal/h};$$

Heat consumption of self-generated coal gas:

$$Q5 = W5 \times C5 \times \Delta t5 = 15400 \times 1.08 \times 260 = 4324320 \text{ KJ/h} = 1.03 \text{ million kCal/h};$$

Heat consumption for temperature rising of brown coal:

$$Q6 = W6 \times C6 \times \Delta t6 = 70000 \times 1.2 \times 80 = 6720000 \text{ KJ/h} = 1.61 \text{ million kCal/h};$$

Theoretic total heat:

$$Q_{theoretic} = Q1 + Q2 + Q3 + Q4 + Q5 + Q6 = 216.4 + 204.2 + 230.9 + 2951 + 103 + 161 = 38.665 \text{ million kCal/h};$$

Calorific value of self-generated coal gas during the manufacturing process:

$$Q7 = 632 \text{kCal/m}^3 \times (140 \text{ t/h} \times 195 \text{ m}^3/t) = 17.25 \text{ million kCal/h};$$

calorific value Q8 (for the waste heat power generation mechanism) carried away by burning the discharged waste gas of 0.2 million m³/h at the temperature of 410 degree Celsius and a pressure of 2000 Pa is calculated as follows.

Converting to the standard state, the discharged waste gas burned is 87 thousand m³/h, and the universal volume enthalpy of the waste gas is 599.199 KJ/m³.

$$Q8 = 87000 \text{ m}^3/\text{h} \times 599.199 \text{ KJ/m}^3 = 12.46 \text{ million kCal/h};$$

Calculating by taking the furnace efficiency as 65%:
Utilized calorific value of the self-generated coal gas:

$$Q9 = Q7 \times 65\% = 11.21 \text{ million kCal/h};$$

Heat consumption of the furnace Q10:

$$Q10 = (Q_{theoretic} - Q9)/65\% = (3866.5 - 1121)/65\% = 2745.5/0.65 = 42.24 \text{ million kCal/h};$$

The actual heat required by the apparatus for manufacturing high-quality coal products according to the present application:

$$Q_{actual} = Q8 + Q10 = 1246 + 4224 = 54.70 \text{ million kCal/h}.$$

It can be seen from the above heat conversion process that, the heat of the heat conducting medium is recovered and matters, such as gas, generated during the production process are recovered in this embodiment, such that the actual heat consumption during the production process is relatively low and is only 54.70 million kCal/h. Therefore, the apparatus for manufacturing high-quality coal products according to this embodiment is capable of treating coal environmentally friendly with a low cost, and may finally obtain high-quality coal products.

An apparatus and system for manufacturing high-quality coal products according to the present application are described in detail hereinbefore. The principle and the embodiments of the present application are illustrated herein by specific examples. The above description of examples is only intended to help the understanding of the method and the spirit of the present application. It should be noted that, for the person skilled in the art, many modifications and improvements may be made to the present application without departing from the principle of the present application, and these modifications and improvements are also deemed to fall into the protection scope of the present application defined by the claims.

The invention claimed is:

1. An apparatus for manufacturing high-quality coal products, comprising a housing, a material feeding end and a material discharging end respectively arranged at two ends of the housing, wherein
at least two series of exhaust passages are arranged outwards from a center of the housing, and each of the exhaust passages communicates with an exhaust end in the housing;
a heat conducting mechanism is arranged in a chamber of the housing between the material feeding end and the material discharging end;
the heat conducting mechanism is provided with a heat conducting medium inlet proximate the material discharging end and a heat conducting medium outlet proximate the material feeding end;
the heat conducting mechanism comprises a plurality of spaced heat conducting units, each of which comprises a plurality of heat conducting tubes communicating with the heat conducting medium inlet and the heat conducting medium outlet; and
a plurality of fins inclining downwardly with respect to a vertical direction are arranged in a longitudinal direction between adjacent heat conducting tubes, and each of the fins arranged between the heat conducting tubes proximate the exhaust passages has a lower end inclining in a direction away from the exhaust passages so as to block an exhaust port arranged on a wall face of the each of the exhaust passages.

2. The apparatus for manufacturing high-quality coal products according to claim 1, wherein the fins comprise: primary fins and secondary fins,
wherein a whole body of each of the primary fins is connected to a pair of adjacent heat conducting tubes; and
wherein each of the secondary fins comprises an upper end connected to a pair of adjacent heat conducting tubes and a lower end extending out of a space between the pair of adjacent heat conducting tubes.

3. The apparatus for manufacturing high-quality coal products according to claim 2, wherein the primary fins located between the heat conducting tubes away from the exhaust passages are arranged to comprise two groups in the longitudinal direction,
wherein one group is located at one side in a space between the heat conducting tubes, and each of the primary fins in this group comprises a lower end inclining in a direction toward a centerline of the housing,
wherein the other group is located at the other side in the space between the heat conducting tubes, and each of the primary fins in this group comprises a lower end inclining in a direction away from the centerline of the housing, and
wherein the two groups of primary fins are arranged alternately in the longitudinal direction.

4. The apparatus for manufacturing high-quality coal products according to claim 2, wherein the secondary fins located between the heat conducting tubes away from the exhaust passages are arranged to comprise two groups in the longitudinal direction,
wherein one group is located at one side in a space between the heat conducting tubes, and each of the secondary fins in this group comprises a lower end inclining in a direction toward a centerline of the housing,
wherein the other group is located at the other side in the space between the heat conducting tubes, and each of the secondary fins in this group comprises a lower end inclining in a direction away from the centerline of the housing, and
wherein the two groups of secondary fins are arranged alternately in the longitudinal direction.

5. The apparatus for manufacturing high-quality coal products according to claim 1, wherein the fins incline downwardly with respect to the vertical direction by an angle ranging from 0 degree to 45 degree.

6. The apparatus for manufacturing high-quality coal products according to claim 5, wherein the fins incline downwardly with respect to the vertical direction by an angle ranging from 8 degree to 45 degree.

7. The apparatus for manufacturing high-quality coal products according to claim 2, wherein an interval between adjacent primary fins in the vertical direction ranges from 70 mm to 3500 mm, and an interval between adjacent secondary fins in the vertical direction ranges from 70 mm to 3500 mm.

8. The apparatus for manufacturing high-quality coal products according to claim 2, wherein the primary fins are distributed at a uniform interval in the vertical direction.

9. The apparatus for manufacturing high-quality coal products according to claim 1, wherein the exhaust passages comprise center exhaust passages arranged in the housing and looped exhaust passages arranged at a periphery of the plurality of heat conducting tubes.

10. The apparatus for manufacturing high-quality coal products according to claim 9, wherein one of the center exhaust passages is arranged in the center of the housing.

11. The apparatus for manufacturing high-quality coal products according to claim 9, wherein one of the looped exhaust passages is arranged at a periphery of the outmost heat conducting tubes.

12. The apparatus for manufacturing high-quality coal products according to claim 9, wherein a plurality of the center exhaust passages are symmetrically arranged with respect to the centerline of the housing.

13. The apparatus for manufacturing high-quality coal products according to claim 9, wherein a plurality of the looped exhaust passages are symmetrically arranged with respect to the centerline of the housing.

14. The apparatus for manufacturing high-quality coal products according to claim 1, wherein a distance between two adjacent series of exhaust passages is less than 1000 mm.

15. The apparatus for manufacturing high-quality coal products according to claim 1, wherein an upper exhaust port is arranged on the housing proximate the material feeding end.

16. The apparatus for manufacturing high-quality coal products according to claim 1, wherein each of the heat conducting units further comprises a heat conducting medium introducing portion and a heat conducting medium discharging portion, and the plurality of heat conducting tubes are arranged between the heat conducting medium introducing portion and the heat conducting medium discharging portion, wherein the heat conducting medium introducing portion of each of the heat conducting units communicates with a heat conducting medium introducing manifold, and the heat conducting medium discharging portion of each of the heat conducting units communicates with a heat conducting medium discharging manifold, and wherein the heat conducting medium introducing portion is arranged proximate the material discharging end, and the heat conducting medium discharging portion is arranged proximate the material feeding end.

17. The apparatus for manufacturing high-quality coal products according to claim 16, wherein the exhaust passages comprise center exhaust passages arranged in the housing and looped exhaust passages arranged at a periphery of the plurality of heat conducting tubes, and each of the center exhaust passage extends to the heat conducting medium introducing portion from a lower end of the heat conducting medium discharging portion.

18. The apparatus for manufacturing high-quality coal products according to claim 1, wherein the heat conducting units are distributed vertically and are parallel to each other.

19. The apparatus for manufacturing high-quality coal products according to claim 1, wherein a distance between each two adjacent heat conducting units changes gradually from top to bottom in the vertical direction.

20. The apparatus for manufacturing high-quality coal products according to claim 1, wherein a distance between each two adjacent heat conducting tubes changes gradually from top to bottom in the vertical direction.

21. The apparatus for manufacturing high-quality coal products according to claim 1, wherein the heat conducting units are distributed at a uniform interval.

22. The apparatus for manufacturing high-quality coal products according to claim 18, wherein the interval between each two adjacent heat conducting units ranges from 70 mm to 500 mm.

23. The apparatus for manufacturing high-quality coal products according to claim 16, wherein the heat conducting medium introducing portion and the heat conducting medium discharging portion in each of the heat conducting units are arranged in a horizontal direction, and the heat conducting tubes are arranged in the vertical direction.

24. The apparatus for manufacturing high-quality coal products according to claim 1, wherein the heat conducting tubes are distributed at a uniform interval.

25. The apparatus for manufacturing high-quality coal products according to claim 1, wherein a cross section of each of the heat conducting tubes is at least one of a square shape, a polygonal shape with five or more sides, a circular shape, and an elliptic shape.

26. The apparatus for manufacturing high-quality coal products according to claim 16, wherein each of the heat conducting medium discharging portions is a straight plate shape and has a spire-shaped upper end.

27. The apparatus for manufacturing high-quality coal products according to claim 16, wherein a fin inclining downwardly in the vertical direction is arranged between each two adjacent heat conducting medium introducing portions.

28. The apparatus for manufacturing high-quality coal products according to claim 16, wherein a plurality of groups of fins are arranged between each two adjacent heat conducting medium introducing portions in the longitudinal direction, and each group comprises a plurality of fins.

29. The apparatus for manufacturing high-quality coal products according to claim 16, wherein each of the heat conducting medium introducing portions is a straight plate shape and has a spire-shaped upper end.

30. The apparatus for manufacturing high-quality coal products according to claim 1, wherein a material feeding hopper is arranged at the material feeding end and comprises a lower end arranged close to an upper end of the heat conducting units.

31. The apparatus for manufacturing high-quality coal products according to claim 30, wherein the material feeding hopper comprises an upper material feeding section, a middle material feeding section and a lower material feeding section, and the middle material feeding section has an opening diameter smaller than that of the upper material feeding section and than that of the lower material feeding section.

32. The apparatus for manufacturing high-quality coal products according to claim 31, wherein the opening diameter of the upper material feeding section decreases gradually from top to bottom, and the opening diameter of the lower material feeding section increases gradually from top to bottom.

33. The apparatus for manufacturing high-quality coal products according to claim 1, wherein a material discharging hopper is arranged at the material discharging end and comprises an upper end arranged close to a lower end of the heat conducting units.

34. The apparatus for manufacturing high-quality coal products according to claim 33, wherein the material discharging hopper comprises an upper material discharging section and a lower material discharging section which are in communication with each other vertically, and the upper material discharging section comprises a plurality of sub-hoppers arranged horizontally.

35. The apparatus for manufacturing high-quality coal products according to claim 34, wherein a water cooling wall is arranged at an outer side of the lower material discharging section.

36. The apparatus for manufacturing high-quality coal products according to claim 33, wherein a material conveyor is arranged at a material discharging port of the material discharging hopper.

37. The apparatus for manufacturing high-quality coal products according to claim 36, wherein the material conveyor is provided with a cooling mechanism.

38. The apparatus for manufacturing high-quality coal products according to claim 37, wherein the cooling mechanism is a water cooling wall arranged on a housing of the material conveyor and a hollow shaft of the material conveyor.

39. The apparatus for manufacturing high-quality coal products according to claim 36, wherein the material conveyor comprises:
   a housing,
   a material feeding port arranged on the housing,
   a material discharging port arranged on the housing, and
   a material conveying screw arranged in the housing, wherein the screw comprises a rotation shaft connected to a driving mechanism.

40. The apparatus for manufacturing high-quality coal products according to claim 39, wherein the material conveying screw has a diameter smaller than an opening diameter of the material discharging port of the material discharging hopper.

41. The apparatus for manufacturing high-quality coal products according to claim 1, wherein the exhaust passages are connected to an exhaust end via an exhaust manifold, and at least an upper end of the exhaust manifold has an opening diameter increasing gradually from top to bottom.

42. The apparatus for manufacturing high-quality coal products according to claim 1, wherein a plurality of the exhaust ends are distributed in a longitudinal direction of the housing.

43. The apparatus for manufacturing high-quality coal products according to claim 42, wherein each of the exhaust ends located at a lower end is connected to a heating mechanism of a heat conducting medium via a connecting tube.

44. The apparatus for manufacturing high-quality coal products according to claim 1, wherein the heat conducting medium is hot gas.

45. The apparatus for manufacturing high-quality coal products according to claim 16, further comprising a temperature controlling mechanism, which comprises:
- a sensor arranged on the heat conducting medium discharging portion of each of the heat conducting units and configured to acquire a temperature signal at the heat conducting medium discharging portion;
- a controller configured to compare the temperature signal with a preset temperature value, and send a temperature controlling instruction according to a comparison result; and
- a valve arranged in the heat conducting medium discharging portion of each of the heat conducting units and configured to regulate a valve opening in response to the temperature controlling instruction.

46. The apparatus for manufacturing high-quality coal products according to claim 1, wherein a sealing member is arranged on the housing proximate the material feeding end so as to prevent the material from escaping from the material feeding end.

47. A system for manufacturing high-quality coal products, comprising:
- a material supply apparatus configured to supply raw coal having a proper treatment granularity for an apparatus for manufacturing high-quality coal products;
- at least one apparatus for manufacturing high-quality coal products, comprising a housing, a material feeding end and a material discharging end respectively arranged at two ends of the housing, wherein
- at least two series of exhaust passages are arranged outwards from a center of the housing, and each of the exhaust passages communicates with an exhaust end in the housing;
- a heat conducting mechanism is arranged in a chamber of the housing between the material feeding end and the material discharging end;
- the heat conducting mechanism is provided with a heat conducting medium inlet proximate the material discharging end and a heat conducting medium outlet proximate the material feeding end;
- the heat conducting mechanism comprises a plurality of spaced heat conducting units, each of which comprises a plurality of heat conducting tubes communicating with the heat conducting medium inlet and the heat conducting medium outlet; and
- a plurality of fins inclining downwardly with respect to a vertical direction are arranged in a longitudinal direction between adjacent heat conducting tubes, and each of the fins arranged between the heat conducting tubes proximate the exhaust passages has a lower end inclining in a direction away from the exhaust passages so as to block an exhaust port arranged on a wall face of the each of the exhaust passages;
- a heat conducting medium supply apparatus connected to the heat conducting medium inlet so as to supply heat conducting medium to the apparatus for manufacturing high-quality coal products; and
- a recycling apparatus communicating with the exhaust end so as to recycle matters discharged from the exhaust end, and connected to the heat conducting medium supply apparatus so as to convey the recycled matters to the heat conducting medium supply apparatus.

48. The system for manufacturing high-quality coal products according to claim 47, wherein
- the recycling apparatus comprises an exhaust cooling apparatus and a matter separating apparatus,
- the exhaust end communicates with the exhaust cooling apparatus,
- the exhaust cooling apparatus is connected to the heat conducting medium supply apparatus, and
- the matter separating apparatus communicates with the exhaust cooling apparatus.

49. The system for manufacturing high-quality coal products according to claim 48, wherein the exhaust cooling apparatus is at least one of a spray tower, a heat exchanger, and a boiler.

50. The system for manufacturing high-quality coal products according to claim 48, wherein the matter separating apparatus is at least one of an oil-water separation pond and a liquid contaminant treating apparatus.

51. The system for manufacturing high-quality coal products according to claim 47, wherein the heat conducting medium outlet comprises two ends, one end of which is connected to a power generation mechanism and the other end of which is connected to the heat conducting medium supply apparatus.

52. The system for manufacturing high-quality coal products according to claim 47, wherein an opening is arranged on the housing proximate the material feeding end and is connected to the recycling apparatus via a tube.

53. The system for manufacturing high-quality coal products according to claim 48, wherein an opening is arranged on the housing proximate the material feeding end and is connected to the exhaust cooling apparatus via a tube.

54. The system for manufacturing high-quality coal products according to claim 47, wherein the heat conducting medium supply apparatus is at least one of a hot-blast furnace, a coal-gas combustion furnace, a coal dust combustion apparatus, a boiler, and a shell and tube heat exchanger.

55. The system for manufacturing high-quality coal products according to claim 47, wherein the heat conducting medium supply apparatus comprises a coal-gas generator, a coal-gas burner, and an air mixing and discharging apparatus which are arranged in sequence, and wherein an air outlet of the air mixing and discharging apparatus is connected to the heat conducting medium inlet of the heat conducting mechanism.

56. The system for manufacturing high-quality coal products according to claim 55, wherein the air mixing and discharging apparatus comprises an air inlet, an air mixing chamber, a steady flowing chamber, and an air outlet which are connected to the coal-gas burner, and the air mixing chamber is further connected to the heat conducting medium outlet of the heat conducting mechanism.

57. The system for manufacturing high-quality coal products according to claim 55, wherein the coal-gas burner is connected to the recycling apparatus.

58. The system for manufacturing high-quality coal products according to claim 47, wherein the material supply apparatus comprises:
- at least one crushing mechanism configured to crush the raw coal; and a sieving mechanism configured to sieve the crushed raw material.

59. The system for manufacturing high-quality coal products according to claim 58, wherein the sieving mechanism is a linear sieve.

60. The system for manufacturing high-quality coal products according to claim 58, wherein the crushing mechanism comprises a double-geared crushing machine and a vibration material feeder, and a material outlet of the vibration material feeder communicates with a material inlet of the double-geared crushing machine.

61. The system for manufacturing high-quality coal products according to claim 51, wherein the power generation mechanism comprises a waste heat power generation boiler, a stream turbine connected to the waste heat power generation boiler, and a power generator connected to the stream turbine, and wherein the waste heat power generation boiler communicates with the heat conducting medium outlet.

62. The system for manufacturing high-quality coal products according to claim 47, wherein the fins comprise: primary fins and secondary fins,
  wherein a body of each of the primary fins is connected to a pair of adjacent heat conducting tubes; and
  wherein each of the secondary fins comprises an upper end connected to a pair of adjacent heat conducting tubes and a lower end extending out of a space between the pair of adjacent heat conducting tubes.

63. The system for manufacturing high-quality coal products according to claim 62, wherein the primary fins located between the heat conducting tubes away from the exhaust passages are arranged to comprise two groups in the longitudinal direction,
  wherein one group is located at one side in a space between the heat conducting tubes, and each of the primary fins in this group comprises a lower end inclining in a direction toward a centerline of the housing,
  wherein the other group is located at the other side in the space between the heat conducting tubes, and each of the primary fins in this group comprises a lower end inclining in a direction away from the centerline of the housing, and
  wherein the two groups of primary fins are arranged alternately in the longitudinal direction.

64. The system for manufacturing high-quality coal products according to claim 62, wherein the secondary fins located between the heat conducting tubes away from the exhaust passages are arranged to comprise two groups in the longitudinal direction,
  wherein one group is located at one side in a space between the heat conducting tubes, and each of the secondary fins in this group comprises a lower end inclining in a direction toward a centerline of the housing,
  wherein the other group is located at the other side in the space between the heat conducting tubes, and each of the secondary fins in this group comprises a lower end inclining in a direction away from the centerline of the housing, and
  wherein the two groups of secondary fins are arranged alternately in the longitudinal direction.

65. The system for manufacturing high-quality coal products according to claim 47, wherein the fin inclines downwardly with respect to the vertical direction by an angle ranging from 0 degree to 45 degree.

66. The system for manufacturing high-quality coal products according to claim 47, wherein the fin inclines downwards with respect to the vertical direction by an angle ranged from 8 degree to 45 degree.

67. The system for manufacturing high-quality coal products according to claim 62, wherein an interval between each two adjacent primary fins in the vertical direction ranges from 70 mm to 3500 mm.

68. The system for manufacturing high-quality coal products according to claim 62, wherein an interval between each two adjacent secondary fins in the vertical direction ranges from 70 mm to 3500 mm.

69. The system for manufacturing high-quality coal products according to claim 62, wherein the primary fins are distributed at a uniform interval in the vertical direction.

70. The system for manufacturing high-quality coal products according to claim 47, wherein the exhaust passages comprise center exhaust passages arranged in the housing and looped exhaust passages arranged at a periphery of the plurality of heat conducting tubes.

71. The system for manufacturing high-quality coal products according to claim 70, wherein one of the center exhaust passages is arranged in the center of the housing.

72. The system for manufacturing high-quality coal products according to claim 70, wherein one of the looped exhaust passages is arranged at a periphery of the outmost heat conducting tubes.

73. The system for manufacturing high-quality coal products according to claim 70, wherein a plurality of center exhaust passages are symmetrically arranged with respect to the centerline of the housing.

74. The system for manufacturing high-quality coal products according to claim 47, wherein a distance between two adjacent series of exhaust passages is below 1000 mm.

75. The system for manufacturing high-quality coal products according to claim 47, wherein each of the heat conducting units further comprises a heat conducting medium introducing portion and a heat conducting medium discharging portion, the plurality of heat conducting tubes are arranged between the heat conducting medium introducing portion and the heat conducting medium discharging portion,
  wherein the heat conducting medium introducing portion of each of the heat conducting units communicates with a heat conducting medium introducing manifold, and the heat conducting medium discharging portion of each of the heat conducting units communicates with a heat conducting medium discharging manifold, and
  wherein the heat conducting medium introducing portion is arranged proximate the material discharging end, and the heat conducting medium discharging portion is arranged proximate the material feeding end.

76. The system for manufacturing high-quality coal products according to claim 70, wherein the exhaust passages comprise a center exhaust passage arranged in the housing and a looped exhaust passage arranged at the periphery of the plurality of heat conducting tubes, and the center exhaust passage extends to the heat conducting medium introducing portion from a lower end of the heat conducting medium discharging portion.

77. The system for manufacturing high-quality coal products according to claim 75, wherein the heat conducting units are distributed vertically and are parallel to each other.

78. The system for manufacturing high-quality coal products according to claim 75, wherein a distance between each two adjacent heat conducting units changes gradually from top to bottom in the vertical direction.

79. The system for manufacturing high-quality coal products according to claim 75, wherein a distance between each two adjacent heat conducting tubes changes gradually from top to bottom in the vertical direction.

80. The system for manufacturing high-quality coal products according to claim 75, wherein the heat conducting units are distributed at a uniform interval.

81. The system for manufacturing high-quality coal products according to claim 80, wherein the interval between each two adjacent heat conducting units ranges from 70 mm to 500 mm.

82. The system for manufacturing high-quality coal products according to claim 75, wherein the heat conducting medium introducing portion and the heat conducting medium discharging portion in each of the heat conducting units are arranged in a horizontal direction, and the heat conducting tubes are arranged in the vertical direction.

83. The system for manufacturing high-quality coal products according to claim 75, wherein the heat conducting tubes are distributed at a uniform interval.

84. The system for manufacturing high-quality coal products according to claim 47, wherein a cross section of each of the heat conducting tube is at least one of a square shape, a polygonal shape with five or more sides, a circular shape, and an elliptic shape.

85. The system for manufacturing high-quality coal products according to claim 75, wherein each of the heat conducting medium discharging portions is a straight plate shape and has a spire-shaped upper end.

86. The system for manufacturing high-quality coal products according to claim 75, wherein a fin inclining downwardly in the vertical direction is arranged between adjacent heat conducting medium introducing portions.

87. The system for manufacturing high-quality coal products according to claim 75, wherein a plurality of groups of fins are arranged between adjacent heat conducting medium introducing portions in the longitudinal direction, and each group comprises a plurality of fins.

88. The system for manufacturing high-quality coal products according to claim 75, wherein each of the heat conducting medium introducing portions is a straight plate shape and has a spire-shaped upper end.

89. The system for manufacturing high-quality coal products according to claim 47, wherein a material feeding hopper is arranged at the material feeding end and comprises a lower end arranged proximate an upper end of the heat conducting unit.

90. The system for manufacturing high-quality coal products according to claim 89, wherein the material feeding hopper comprises an upper material feeding section, a middle material feeding section and a lower material feeding section, and the middle material feeding section has an opening diameter smaller than that of the upper material feeding section and than that of the lower material feeding section.

91. The system for manufacturing high-quality coal products according to claim 90, wherein the opening diameter of the upper material feeding section decreases gradually from top to bottom, and the opening diameter of the lower material feeding section increases gradually from top to bottom.

92. The system for manufacturing high-quality coal products according to claim 47, wherein a material discharging hopper is arranged at the material discharging end and comprises an upper end arranged proximate a lower end of the heat conducting unit.

93. The system for manufacturing high-quality coal products according to claim 92, wherein the material discharging hopper comprises an upper material discharging section and a lower material discharging section which are in communication with each other vertically, and the upper material discharging section comprises a plurality of sub-hoppers arranged horizontally.

94. The system for manufacturing high-quality coal products according to claim 93, wherein a water cooling wall is arranged at an outer side of the lower material discharging section.

95. The system for manufacturing high-quality coal products according to claim 92, wherein a material conveyor is arranged at a material discharging port of the material discharging hopper.

96. The system for manufacturing high-quality coal products according to claim 95, wherein the material conveyor is provided with a cooling mechanism.

97. The system for manufacturing high-quality coal products according to claim 96, wherein the cooling mechanism is a water cooling wall arranged on a housing of the material conveyor and a hollow shaft of the material conveyor.

98. The system for manufacturing high-quality coal products according to claim 95, wherein the material conveyor comprises:
 a housing,
 a material feeding port arranged on the housing,
 a material discharging port arranged on the housing, and
 a material conveying screw arranged in the housing, wherein the screw comprises a rotation shaft connected to a driving mechanism.

99. The system for manufacturing high-quality coal products according to claim 98, wherein the material conveying screw has a diameter smaller than an opening diameter of the material discharging port of the material discharging hopper.

100. The system for manufacturing high-quality coal products according to claim 47, wherein the exhaust passages are connected to an exhaust end via an exhaust manifold, and at least an upper end of the exhaust manifold has an opening diameter increasing gradually from top to bottom.

101. The system for manufacturing high-quality coal products according to claim 47, wherein a plurality of exhaust ends are distributed in a longitudinal direction of the housing.

102. The system for manufacturing high-quality coal products according to claim 101, wherein the exhaust end located at a lower end is connected to a heating mechanism of a heat conducting medium via a connecting tube.

103. The system for manufacturing high-quality coal products according to claim 47, wherein the heat conducting medium is hot gas.

104. The system for manufacturing high-quality coal products according to claim 47, further comprising a temperature controlling mechanism, which comprises:
 a sensor arranged on the heat conducting medium discharging portion of each of the heat conducting units and configured to acquire a temperature signal at the heat conducting medium discharging portion;
 a controller configured to compare the temperature signal with a preset temperature value, and send a temperature controlling instruction according to a comparison result; and
 a valve arranged in the heat conducting medium discharging portion of each of the heat conducting units and configured to regulate a valve opening in response to the temperature controlling instruction.

105. The system for manufacturing high-quality coal products according to claim 47, wherein a sealing member is arranged on the housing proximate the material feeding end so as to prevent the material from escaping from the material feeding end.

* * * * *